United States Patent
Asaoka et al.

(10) Patent No.: US 10,036,837 B2
(45) Date of Patent: Jul. 31, 2018

(54) MOTHER SUBSTRATE, LIGHT-CONTROL MEMBER, METHOD FOR MANUFACTURING LIGHT-CONTROL MEMBER, AND DISPLAY DEVICE

(71) Applicant: Sharp Kabushiki Kaisha, Osaka-shi, Osaka (JP)

(72) Inventors: Yasushi Asaoka, Osaka (JP); Shohei Katsuta, Osaka (JP); Hideomi Yui, Osaka (JP); Sho Ochi, Osaka (JP); Tsuyoshi Maeda, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 115 days.

(21) Appl. No.: 15/033,684

(22) PCT Filed: Nov. 7, 2014

(86) PCT No.: PCT/JP2014/079581
§ 371 (c)(1),
(2) Date: May 2, 2016

(87) PCT Pub. No.: WO2015/068802
PCT Pub. Date: May 14, 2015

(65) Prior Publication Data
US 2016/0291218 A1  Oct. 6, 2016

(30) Foreign Application Priority Data
Nov. 8, 2013  (JP) .................................. 2013-232418

(51) Int. Cl.
G02F 1/1335 (2006.01)
G02B 5/02 (2006.01)
G02B 5/20 (2006.01)

(52) U.S. Cl.
CPC ......... G02B 5/0278 (2013.01); G02B 5/0236 (2013.01); G02B 5/0268 (2013.01);
(Continued)

(58) Field of Classification Search
CPC .. G02B 5/0278; G02B 5/0236; G02B 5/0268; G02B 5/208; G02F 1/133504; G02F 1/133606
See application file for complete search history.

(56) References Cited

U.S. PATENT DOCUMENTS

2002/0176038 A1  11/2002  Watanabe et al.
2009/0231715 A1  9/2009  Hiroya et al.
(Continued)

FOREIGN PATENT DOCUMENTS

JP  2000-352608 A  12/2000
JP  2002-309199 A  10/2002
(Continued)

OTHER PUBLICATIONS

Official Communication issued in International Patent Application No. PCT/JP2014/079581, dated Feb. 10, 2015.

*Primary Examiner* — Nathanael R Briggs
(74) *Attorney, Agent, or Firm* — Keating & Bennett, LLP

(57) ABSTRACT

A light-control member (13) includes a substrate (39); light-shielding layers (40) provided in a first area (A1) on one surface (39a) of the substrate (39); a light-diffusion section (41) provided in an area other than the light-shielding layers (40) in the first area (A1) and formed of light transmitting material; and a support section(45) provided in a second area (A2) positioned on an outer side of the first area (A1) on the one surface (39a), in which the light-diffusion section (41) has a light emitting end surface (41a) in contact with the one surface (39a) of the substrate (39), a light incident end surface (41b) opposing the light emitting (Continued)

end surface (41*a*) and having an area greater than an area of the light emitting end surface (41*a*), and a reflective surface (41*c*) which is in contact with the light emitting end surface (41*a*) and the light incident end surface (41*b*) and on which light incident from the light incident end surface (41*b*) is reflected, and a formation area of the support section (45) per unit area in the second area (A2) is greater than a formation area of the support section (45) per unit area in the first area (A1).

16 Claims, 23 Drawing Sheets

(52) U.S. Cl.
CPC ....... *G02B 5/208* (2013.01); *G02F 1/133504* (2013.01); *G02F 1/133606* (2013.01)

(56) References Cited

U.S. PATENT DOCUMENTS

| | | | |
|---|---|---|---|
| 2012/0212676 A1* | 8/2012 | Kuromizu | G02F 1/133308 348/725 |
| 2013/0094174 A1* | 4/2013 | Yamamoto | G02B 5/0215 362/19 |
| 2013/0265774 A1 | 10/2013 | Umeda et al. | |
| 2014/0354927 A1 | 12/2014 | Kanno et al. | |

FOREIGN PATENT DOCUMENTS

| | | | | |
|---|---|---|---|---|
| JP | 2009-222903 A | 10/2009 | | |
| JP | 2010-223996 A | 10/2010 | | |
| JP | WO 2012086424 A1 * | 6/2012 | ....... | G02F 1/133504 |
| WO | 2012/086424 A1 | 6/2012 | | |
| WO | 2013/099839 A1 | 7/2013 | | |

* cited by examiner

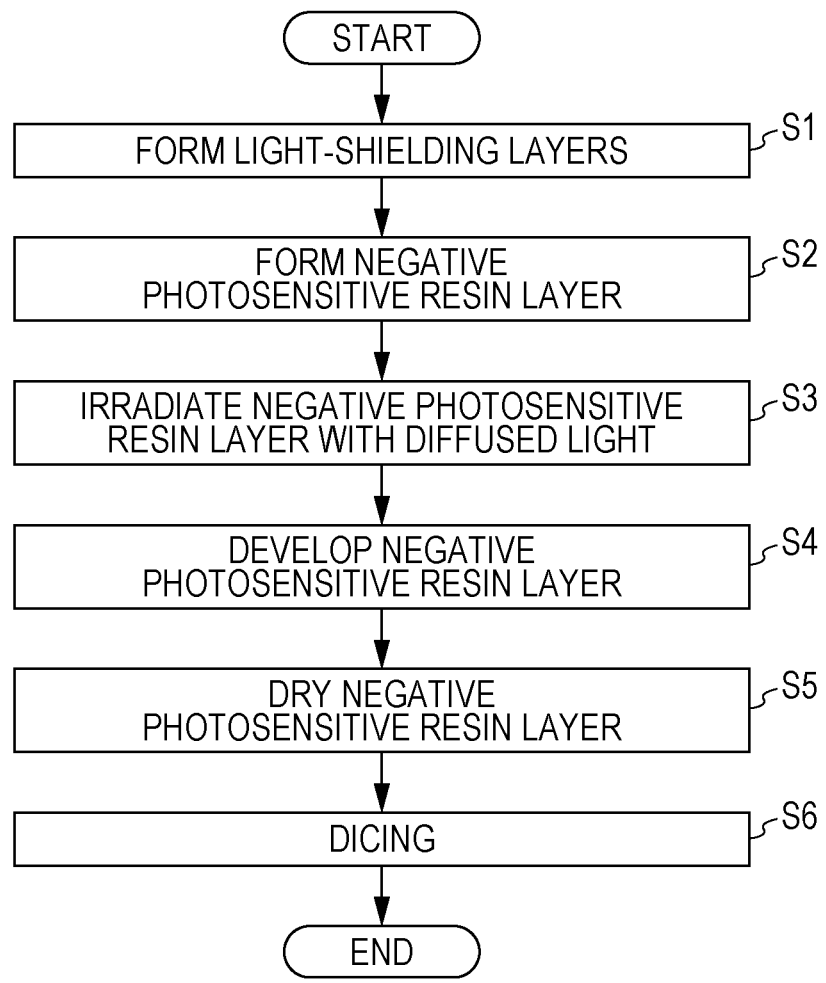

FIG. 12B
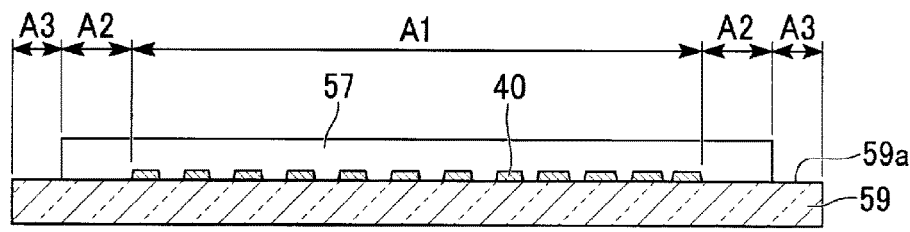
FIG. 12C
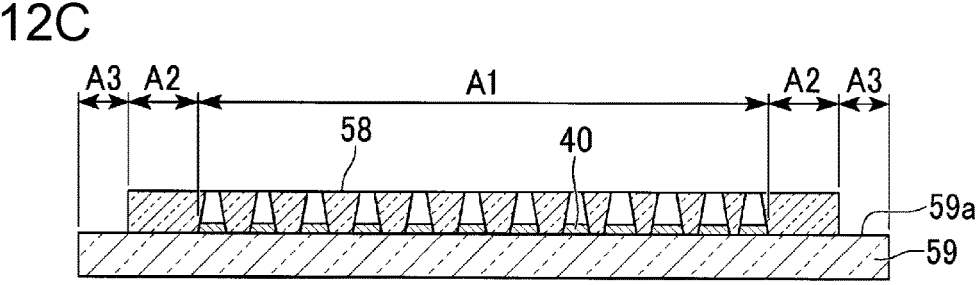
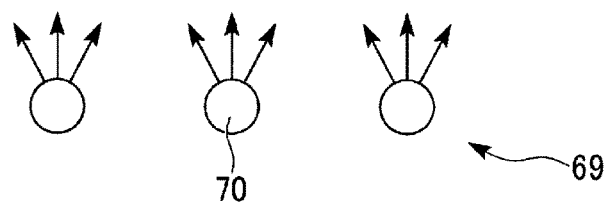
FIG. 12D
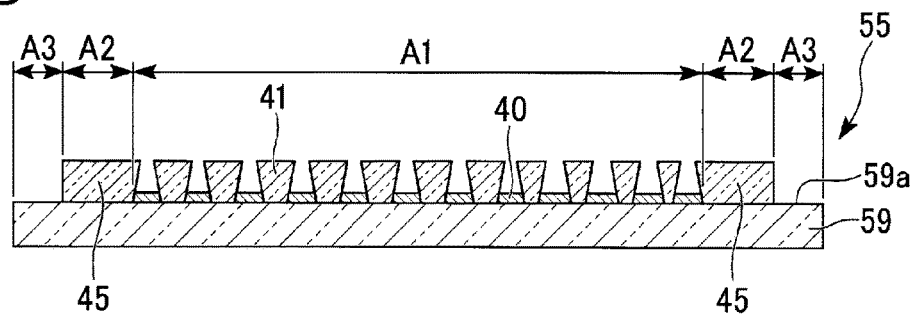

MOTHER SUBSTRATE, LIGHT-CONTROL MEMBER, METHOD FOR MANUFACTURING LIGHT-CONTROL MEMBER, AND DISPLAY DEVICE

TECHNICAL FIELD

The present invention relates to a mother substrate, a light-control member, a method for manufacturing the light-control member, and a display device.

This application claims priority based on Japanese Patent Application No. 2013-232418 filed in Japan on Nov. 8, 2013, the content of which is incorporated herein.

BACKGROUND ART

Liquid crystal display devices are widely used for displays of portable electronic equipment such as mobile phones, televisions, personal computers, and the like. Liquid crystal display devices generally provide good visibility when seen from the front but have a narrow viewing angle. Thus, various studies for widening the viewing angle have been done. As one of them, proposed is a configuration in which a member to control a diffusion angle of light emitted from a display body such as a liquid crystal panel (hereinafter, referred to as a light-diffusion member) is provided on a viewing side of the display body.

For example, PTL 1 described below discloses a light-control member in which a light-diffusion layer has grooves each having a V-shaped cross section and a light absorption layer is provided in part of the grooves. In the light-control member, a transparent sheet formed of a polyethylene terephthalate (PET) or the like is arranged on a light incident side and a light emission side of the light-diffusion layer. A part of light vertically incident on the light-diffusion layer is totally reflected on wall surfaces of the grooves and then emitted. Thereby, the light emitted from the light-control member is diffused.

CITATION LIST

Patent Literature

PTL 1: Japanese Unexamined Patent Application Publication No. 2000-352608

SUMMARY OF INVENTION

Technical Problem

When the light-control member is manufactured by a roll-to-roll process, a transparent negative resist is applied to a long substrate in a predetermined thickness to form a light-diffusion section and the substrate is wound by a winding roller. A transparent negative resist layer needs to be formed to have a width narrower than a width of the substrate (width in a lateral direction) so as not to contaminate a rear side of the substrate or a laminating device.

When the substrate on which the light-diffusion section has been formed is wound, however, the light-diffusion section is deformed because load concentrates on a step portion generated between both ends of the substrate and the light-diffusion section. In a case where an area in which the light-diffusion section and the substrate are closely adhered to each other is small in an outer peripheral portion of the light-diffusion section, the light-diffusion section and the substrate may be separated when a peripheral portion of the light-diffusion section is subjected to force.

This problem may be caused not only by the roll-to-roll process but also by other manufacturing methods.

One aspect of the invention has been made in view of the problem of the conventional art as described above, and an object thereof is to provide a mother substrate, a light-control member, a method for manufacturing the light-control member, and a display device which provide excellent optical performance by preventing defects caused in a manufacturing process.

Solution to Problem

A mother substrate according to one aspect of the invention includes: a first substrate having light transmissivity and including a light-control member formation area; light-shielding layers provided in a first area in the light-control member formation area; a plurality of light-diffusion sections provided in an area other than the light-shielding layers in the first area and formed of light transmitting material; and the light transmitting material provided in a second area positioned on an outer side of the first area in the light-control member formation area, in which each of the light-diffusion sections has a light emitting end surface positioned at one end of a first surface side of the first substrate, a light incident end surface opposing the light emitting end surface and having an area greater than an area of the light emitting end surface, and a reflective surface which is in contact with the light emitting end surface and the light incident end surface and on which light incident from the light incident end surface is reflected, and a formation area of the light transmitting material per unit area in the second area is greater than a formation area of the light transmitting material per unit area in the first area.

In the mother substrate according to one aspect of the invention, it may be configured so that the light-shielding layers are provided in the second area, and the light-shielding layers provided in the second area have a UV transmission rate that is higher than a UV transmission rate of the light-shielding layers provided in the first area.

In the mother substrate according to one aspect of the invention, it may be configured so that a width in planar view of the light transmitting material provided in the second area is wider than an arrangement interval between the light-shielding layers in the first area.

In the mother substrate according to one aspect of the invention, it may be configured so that the light-shielding layers are provided in the second area, and a size in planar view of each of the light-shielding layers provided in the second area is smaller than a size in planar view of each of the light-shielding layers provided in the first area.

In the mother substrate according to one aspect of the invention, it may be configured so that a plurality of light-shielding layers are provided only in the first area.

In the mother substrate according to one aspect of the invention, it may be configured so that a periphery of the first area is surrounded by the second area.

In the mother substrate according to one aspect of the invention, it may be configured so that a third area in which neither the light-shielding layer nor the light transmitting material is present is provided on an outer side of the second area on the first surface of the first substrate.

In the mother substrate according to one aspect of the invention, it may be configured so that a second substrate is arranged opposing the first surface of the first substrate with the light transmitting material therebetween, and an elastic member is arranged between the light transmitting material and the second substrate.

A light-control member according to one aspect of the invention includes: a first substrate having light transmissivity; light-shielding layers provided in a first area on a first surface of the first substrate; a light-diffusion section provided in an area other than the light-shielding layers in the first area and formed of light transmitting material; and the light transmitting material provided in a second area positioned on an outer side of the first area on the first surface, in which the light-diffusion section has a light emitting end surface in contact with the first surface of the first substrate, a light incident end surface opposing the light emitting end surface and having an area greater than an area of the light emitting end surface, and a reflective surface which is in contact with the light emitting end surface and the light incident end surface and on which light incident from the light incident end surface is reflected, and a formation area of the light transmitting material per unit area in the second area is greater than a formation area of the light transmitting material per unit area in the first area.

A light-control member manufacturing method according to one aspect of the invention is a light-control member manufacturing method for manufacturing a plurality of light-control members from a mother substrate having a plurality of light-control member formation areas on a first surface of a first substrate, the light-control member manufacturing method including: a step of forming light-shielding layers in a first area of the first surface; a step of forming a photosensitive resin layer in the first area in which the light-shielding layers are formed and a second area positioned on an outer side of the first area; a step of radiating light from a second surface side opposite to the first surface of the first substrate and exposing the photosensitive resin layer to light by using the light-shielding layers as a mask; a step of developing the photosensitive resin layer to thereby form a light-diffusion section in the first area and form light transmitting material in the second area; and a step of cutting off the first substrate for each of the light-control member formation areas to obtain the plurality of light-control members, in which at the step of forming the light transmitting material and the light-diffusion section simultaneously, the formation is performed such that a formation area of the light transmitting material per unit area in the second area is greater than a formation area of the light transmitting material per unit area in the first area.

The light-control member manufacturing method according to one aspect of the invention may be a manufacturing method in which the first substrate is cut off in the second area.

The light-control member manufacturing method according to one aspect of the invention may be a manufacturing method in which the first substrate is fed by a roll-to-roll process, and the photosensitive resin layer is formed on an inner side of both ends in a direction perpendicular to a feeding direction of the first substrate.

A display device according to one aspect of the invention includes: a display body which receives an input signal and outputs a video image; and a light-control member which is provided on a viewing side of the display body and diffuses and outputs light incident from the display body, in which the light control member is formed of the aforementioned light-control member, and the light-control member is provided such that a first area in which the light-diffusion section is formed is positioned in a display area of the display body and a second area in which the light transmitting material is formed is positioned in an area other than the display area.

In the display device according to one aspect of the invention, the light-control member is configured to have anisotropic scattering characteristics, and an azimuthal direction in which a luminance viewing angle of the display body is relatively narrow and an azimuthal direction in which diffusivity of the light-control member is relatively strong substantially coincide with each other.

Advantageous Effects of Invention

With a mother substrate and a light-control member according to one aspect of the invention, it is possible to provide a mother substrate and a light-control member which provide excellent optical performance by preventing defects caused in a manufacturing process. With a light-control member manufacturing method according to one aspect of the invention, it is possible to provide a light-control member which provides excellent optical performance by preventing defects caused in a manufacturing process. With a display device according to one aspect of the invention, it is possible to provide a display device which provides excellent display quality.

BRIEF DESCRIPTION OF DRAWINGS

FIG. 10 is a flowchart illustrating the method for manufacturing the light-control member.

FIG. 12B is a second sectional view of the substrate in the lateral direction for explaining in order the process of manufacturing the light-control member (mother roll).

FIG. 12C is a third sectional view of the substrate in the lateral direction for explaining in order the process of manufacturing the light-control member (mother roll).

FIG. 12D is a fourth sectional view of the substrate in the lateral direction for explaining in order the process of manufacturing the light-control member (mother roll).

DESCRIPTION OF EMBODIMENTS

Hereinafter, with reference to drawings, description will be given for one embodiment of a light-control member, a method for manufacturing the light-control member, and a display device with the use of a mother substrate of the invention.

The following embodiments are described in detail for better understanding of the spirit of the invention, and do not limit the invention unless particularly stated.

First Embodiment

As a first embodiment of the invention, a liquid crystal display device (display device) 1 illustrated in FIG. 1 will be described.

Figure 1:
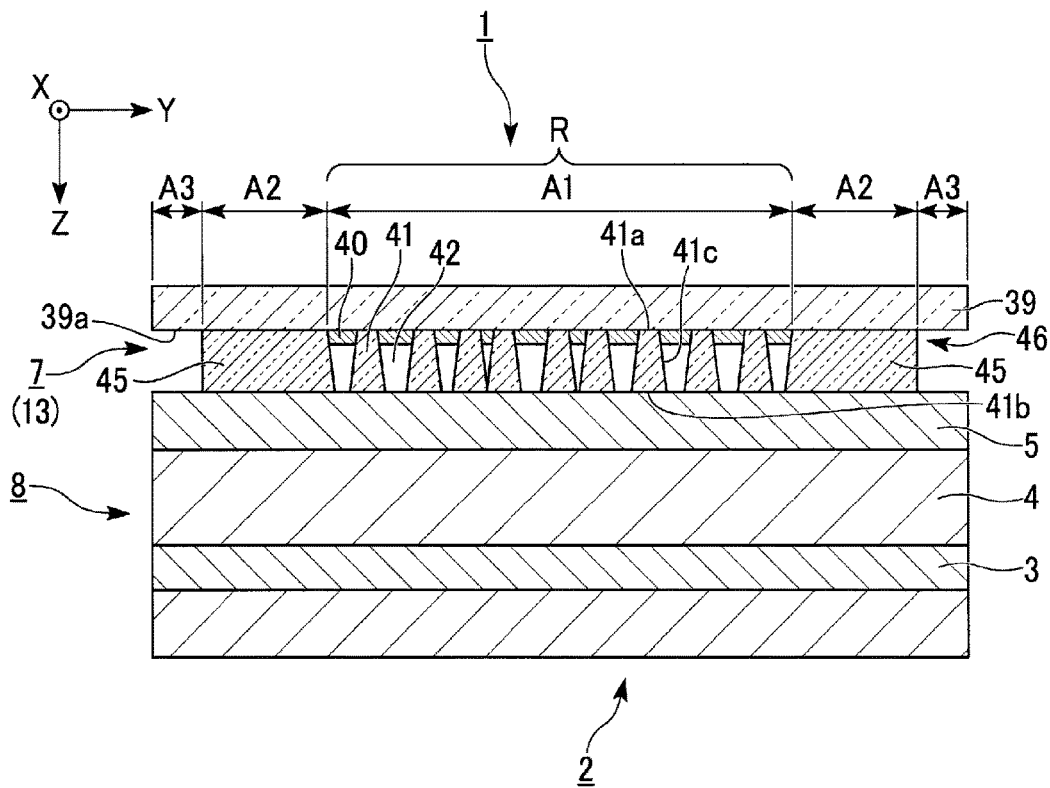
FIG. 1 is a sectional view illustrating a schematic configuration of a liquid crystal display device.

FIG. 1 is a sectional view illustrating a schematic configuration of the liquid crystal display device 1.

As illustrated in FIG. 1, the liquid crystal display device 1 includes a backlight 2, a first polarizer 3, a liquid crystal panel 4, a second polarizer 5, and a light-control member 7 formed of a light-control member described below. Among them, the backlight 2, the first polarizer 3, the liquid crystal panel 4, and the second polarizer 5 form a liquid crystal display body (display body) 8.

An observer views a display from an upper side of the liquid crystal display device 1 of FIG. 1, in which the light-control member 7 is arranged. In the following description, the side on which the light-control member 7 is arranged is referred to as a viewing side, and the side on which the backlight 2 is arranged is referred to as a rear surface side. In the following description, an X-axis is defined as a horizontal direction of a screen of the liquid crystal display device 1, a Y-axis is defined as a vertical direction of the screen of the liquid crystal display device 1, and a Z-axis is defined as a thickness direction of the liquid crystal display device 1.

In the liquid crystal display device 1 of the present embodiment, light emitted from the backlight 2 is modulated by the liquid crystal panel 4, and certain images, characters, or the like are displayed with the modulated light. In addition, when light output from the liquid crystal panel 4 passes through the light-control member 7, the light is output from the light-control member 7 with a wider luminous intensity distribution (diffusion angle distribution) than before entering the light-control member 7.

This enables the observer to visually recognize the displayed images or the like from a wider viewing angle.

A specific configuration of the liquid crystal panel 4 will be described below.

Here, an active matrix transmissive liquid crystal panel will be described as an example. However, liquid crystal panels applicable to the invention are not limited to active matrix transmissive liquid crystal panels. A liquid crystal panel applicable to the invention may be, for example, a semi-transmissive (transmissive and reflective) liquid crystal panel. Further, even a passive matrix liquid crystal panel in which each pixel does not include a switching thin film transistor (hereinafter, abbreviated to a TFT) may be used.

Figure 2:
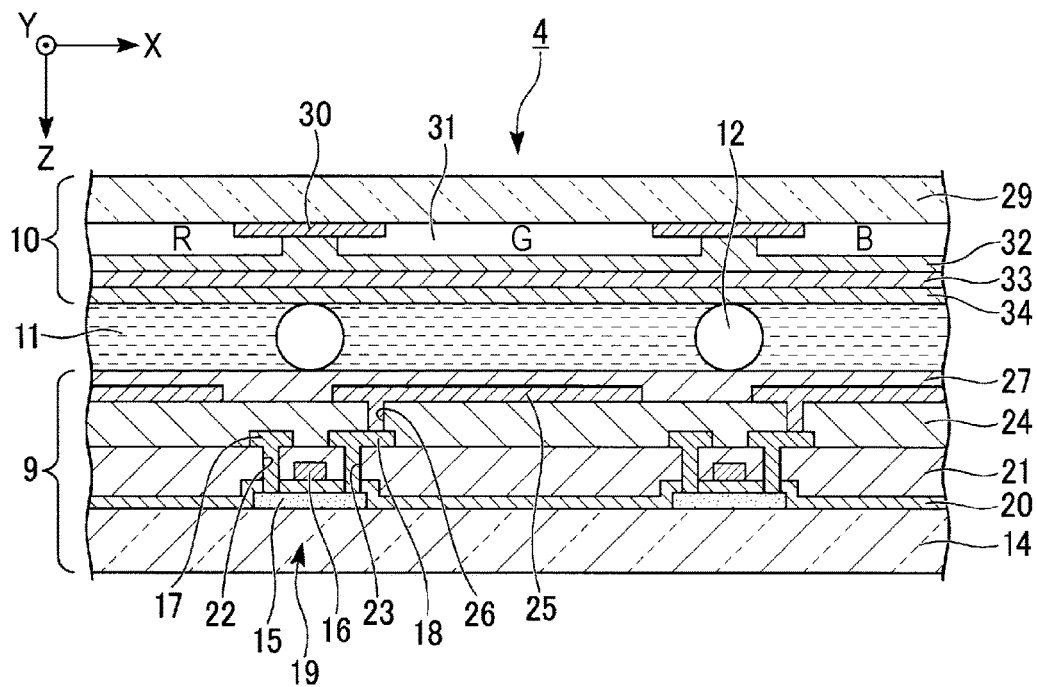
FIG. 2 is a sectional view illustrating a schematic configuration of a liquid crystal panel.

FIG. 2 is a sectional view illustrating a schematic configuration of the liquid crystal panel.

As illustrated in FIG. 2, the liquid crystal panel 4 roughly includes a TFT substrate (also referred to as an element substrate) 9, a color filter substrate (also referred to as an opposed substrate) 10 arranged opposite the TFT substrate 9, and a liquid crystal layer 11 arranged between the TFT substrate 9 and the color filter substrate 10.

By sealing a periphery of a portion between the TFT substrate 9 and the color filter substrate 10 with a sealing member (not illustrated) and injecting liquid crystal into the portion therebetween, the liquid crystal layer 11 is held between the TFT substrate 9 and the color filter substrate 10. In addition, spherical spacers 12 for keeping an interval between the TFT substrate 9 and the color filter 10 constant are arranged therebetween.

On the TFT substrate 9, a plurality of pixels (not illustrated), which are the smallest unit regions of display, are arranged in a matrix manner. In the TFT substrate 9, a plurality of source bus lines (not illustrated) are formed so as to extend parallel to each other and a plurality of gate bus lines (not illustrated) are formed so as to extend parallel to each other and to be orthogonal to the plurality of source bus lines.

Accordingly, the plurality of source bus lines and the plurality of gate bus lines are formed in a grid manner on the TFT substrate 9, and a rectangular area defined by neighboring source bus lines and neighboring gate bus lines represents one pixel. The source bus lines are connected to a source electrode of the TFT described below and the gate bus lines are connected to the gate electrode of the TFT.

On a surface of a transparent substrate 14 forming the TFT substrate 9 on the liquid crystal layer 11 side, a TFT 19 including a semiconductor layer 15, a gate electrode 16, a source electrode 17, a drain electrode 18, and the like is formed.

For the transparent substrate 14, a glass substrate may be used, for example. On the transparent substrate 14, the semiconductor layer 15, which is formed from semiconductor material, such as continuous grain silicon (CGS), low-temperature poly-silicon (LPS), and amorphous silicon (α-Si), is formed. On the transparent substrate 14, a gate insulation film 20 is formed so as to cover the semiconductor layer 15. The material of the gate insulation film 20 may be a silicon oxide film, a silicon nitride film, or a laminated film thereof, for example. On the gate insulation film 20, the gate electrode 16 is formed opposite the semiconductor layer 15. For the material of the gate electrode 16, for example, a laminated film of tungsten (W)/tantalum nitride (TaN), molybdenum (Mo), titanium (Ti), aluminum (Al), and the like are used.

On the gate insulation film 20, a first interlayer insulation film 21 is formed so as to cover the gate electrode 16. For the material of the first interlayer insulation film 21, for example, a silicon oxide film, a silicon nitride film, a laminated film thereof, or the like is used. On the first interlayer insulation film 21, the source electrode 17 and the drain electrode 18 are formed. The source electrode 17 is connected to a source area of the semiconductor layer 15 through a contact hole 22, which is formed through the first interlayer insulation film 21 and the gate insulation film 20. Similarly, the drain electrode 18 is connected to a drain area of the semiconductor layer 15 through a contact hole 23, which is formed through the first interlayer insulation film 21 and the gate insulation film 20. For the material of the source electrode 17 and the drain electrode 18, conductive material similar to that of the gate electrode 16 is used. On the first interlayer insulation film 21, a second interlayer insulation film 24 is formed so as to cover the source electrode 17 and the drain electrode 18. For the second interlayer insulation film 24, material similar to that of the first interlayer insulation film 21 or organic insulating material is used.

On the second interlayer insulation film 24, a pixel electrode 25 is formed. The pixel electrode 25 is connected to the drain electrode 18 through a contact hole 26 which is formed through the second interlayer insulation film 24. That is, the pixel electrode 25 is connected with the drain area of the semiconductor layer 15 via the drain electrode 18 as a relay electrode. For the material of the pixel electrode 25, for example, transparent electrically conductive material, such as indium tin oxide (ITO) and indium zinc oxide (IZO), is used. With such a configuration, when a scanning signal is supplied through a gate bus line and the TFT 19 turns on, an image signal supplied to the source electrode 17 through a source bus line is supplied to the pixel electrode 25 via the semiconductor layer 15 and the drain electrode 18. An alignment film 27 is formed on the entire surface of the second interlayer insulation film 24 so as to cover the pixel electrode 25. The alignment film 27 has alignment controlling force to align liquid crystal molecules, which form the liquid crystal layer 11, with certain azimuth and angle by performing special processing such as rubbing. Note that, the TFT may be either a top-gate TFT as illustrated in FIG. 2 or a bottom-gate TFT.

On the surface of the transparent substrate 29 forming the color filter substrate 10 on the liquid crystal layer 11 side, a black matrix 30, a color filter 31, a planarizing layer 32, a counter electrode 33, and an alignment film 34 are formed in sequence. The black matrix 30 has a function of shielding transmission of light in inter-pixel regions, and is formed from metal such as chromium (Cr) or a multilayer film of Cr/Cr oxide, or photoresist having carbon particles dispersed in photosensitive resin. A color filter 31 includes pigments of the colors of red (R), green (G), and blue (B), and the color filter 31 of any one of R, G, and B is arranged so as to oppose one of the pixel electrodes 25 on the TFT substrate 9. Note that, the color filter 31 may have a multicolor configuration of three colors R, G, and B or more. The planarization layer 32 is made of an insulation film to cover the black matrix 30 and the color filter 31, and has a function of lessening and smoothing unevenness caused by the black matrix 30 and the color filter 31. The counter electrode 33 is formed on the planarization layer 32. For the material of the counter electrode 33, transparent electrically conductive material similar to that of the pixel electrode 25 is used. The entire surface of the counter electrode 33 is subjected to rubbing processing and the alignment film 34 having horizontal alignment controlling force is formed thereon.

Next, the light-control member forming the light-diffusion member will be described.

The light-control member 7 in the present embodiment is formed by a light-control member 13 described below.

As illustrated in FIG. 1, the light-control member 13 includes a substrate (first substrate) 39, a plurality of light-shielding layers 40, and a light-diffusion layer 46.

The light diffusion layer 46 is mainly formed of a light-diffusion section 41 and a support section (light transmitting material) 45. The light-diffusion section 41 is formed in an area other than an area where the light-shielding layers 40 are formed, in a first area A1 of an inner surface (first surface) 39a. The support section 45 is formed in each second area A2 positioned on each outer side of the first area A1, and formed integrally with the light-diffusion section 41 with the same material as that of the light-diffusion section 41 (light transmitting material).

The light-control member 13 is arranged on the second polarizer 5 with a posture that the side on which the light-diffusion section 41 is provided faces the second polarizer 5 and the substrate 39 side faces the viewing side. The light-control member 13 is fixed to the second polarizer 5 with an adhesive layer (not illustrated).

For the substrate 39, a substrate formed from transparent resin, such as a triacetylcellulose (TAC) film, polyethylene terephthalate (PET), polycarbonate (PC), polyethylene naphthalate (PEN), and a polyethersulfone (PES) film is preferably used. The substrate 39 serves as a foundation used for applying materials of the light-shielding layers 40 and the light-diffusion section 41 later in a manufacturing process. The substrate 39 is required to have heat resistance and mechanical strength to withstand a heat processing step in the manufacturing process. Thus, for the substrate 39, a base made of glass and the like may be used in addition to a base made of resin. However, the substrate 39 is preferably thin to the extent that heat resistance and mechanical strength are not lost. This is because blur of a displayed image is more likely to occur as the thickness of the substrate 39 increases. The substrate 39 also preferably has a total light transmittance of 90% or higher pursuant to the requirement of JIS K7361-1. With a total light transmittance of 90% or higher, sufficient transparency is obtained.

The present embodiment uses a transparent resin-based material having a thickness of 100 μm as an example.

The light-shielding layers 40 are arranged randomly when seen from a normal direction of a main surface of the substrate 39. An interval (pitch) between neighboring light-shielding layers 40 is arranged neither regularly nor periodically. It is preferable that the interval (pitch) of the light-shielding layers 40 is smaller than a pixel interval (pitch, 150 μm for example) on the liquid crystal panel 4. Thereby, at least one light-shielding layer 40 is formed in a pixel. Accordingly, a wide viewing angle is achieved also when combined with a liquid crystal panel having a small pixel pitch for use with mobile equipment, for example.

As one example, the light shielding layers 40 are made of organic material having light absorbency and photosensitivity, such as black resist and a black ink. In addition, a metal film of chromium (Cr), or a multilayer film of Cr/Cr oxide may be used. The organic material forming the light shielding layers 40 may include ultraviolet ray absorbing material that absorbs ultraviolet rays.

The light-diffusion section 41 is made of organic material having light transmissivity and photosensitivity, such as acrylic resin, and epoxy resin. The light-diffusion section 41 preferably has a total light transmittance of 90% or higher pursuant to the requirement of JIS K7361-1. With a total light transmittance of 90% or higher, sufficient transparency is obtained.

The light-diffusion section 41 has a light emitting end surface 41a, a light incident end surface 41b, and a reflective surface 41c as illustrated in FIG. 1. The light emitting end surface 41a is a surface in contact with the substrate 39. The light incident end surface 41b is a surface opposite the light emitting end surface 41a. The reflective surface 41c is a tapered side surface of the light-diffusion section 41. The reflective surface 41c is a surface on which light incident from the light incident end surface 41b is reflected. An area of the light incident end surface 41b is larger than an area of the light emitting end surface 41a.

The light-diffusion section 41 is a portion contributing to light transmission in the light-control member 13. That is, the light incident on the light-diffusion section 41 is guided therethrough being substantially enclosed within the light-diffusion section 41 while being totally reflected on the reflective surface 41c of the light-diffusion section 41, and is emitted.

The light-control member 13 is arranged so that the substrate 39 faces the viewing side. Of the two opposite surfaces of the light-diffusion section 41, the surface having a smaller area serves as the light emitting end surface 41a. On the other hand, the surface having a larger area serves as the light incident end surface 41b.

An inclination angle (an angle formed by the light incident end surface 41b and the reflective surface 41c) of the reflective surface 41c of the light-diffusion section 41 is preferably 75° or more to 89° or less. In the present embodiment, the inclination angle of the reflective surface 41c of the light-diffusion section 41 is 75°. However, there is no particular limitation to the inclination angle of the reflective surface 41c of the light-diffusion section 41 as long as allowing sufficient diffusion of incident light when light is output from the light-control member 13. In the present embodiment, the inclination angle of the reflective surface 41c of the light-diffusion section 41 is constant.

A height between the light incident end surface 41b and the light emitting end surface 41a of the light-diffusion section 41 is set so as to be greater than a layer thickness of the light-shielding layer 40. In the case of the present embodiment, the layer thickness of the light-shielding layer 40 is around 150 nm, for example. The height between the light incident end surface 41b and the light emitting end surface 41a of the light-diffusion section 41 is around 20 μm, for example.

A portion surrounded by the reflective surface 41c of the light-diffusion section 41 and the light-shielding layer 40 serves as a hollow portion 42. In the case of the present embodiment, air is present in the hollow portion 42 (outside of the light-diffusion section 41). Accordingly, when the light-diffusion section 41 is formed of, for example, a transparent acrylic resin, the reflective surface 41c of the light-diffusion section 41 serves as an interface of the transparent acrylic resin and the air. In this case, the hollow portion 42 may be filled with another low-refractive-index material. However, a difference in refractive index at the interface of the inside and outside of the light-diffusion section 41 is the greatest when air is present at the outside, as compared to a case with any low-refractive-index material. According to Snell's law, a critical angle is the smallest according to the configuration of the present embodiment, and an incident angle range of total reflection of light at the reflective surface 41c of the light-diffusion section 41 is the largest. As a result, loss of light is further suppressed, and a high level of luminance is able to be obtained.

Note that in the present embodiment, the presence of a low-reflective-index material means that a periphery of the light-diffusion section 41 is brought into a low-reflective-index state in order to enable total reflection of light. Accordingly, it is set that a state where the hollow portion 42 is filled with an inert gas such as nitrogen instead of air is also included. Alternatively, inside of the hollow portion 42 may be in a vacuum state or may be in a depressurized state as compared to the atmosphere.

The refractive index of the substrate 39 and the refractive index of the light-diffusion section 41 are preferably substantially equal. The reason is as follows. Considered is a case where the refractive index of the substrate 39 and the refractive index of the light-diffusion section 41 are different greatly, for example. In this case, unnecessary refraction and reflection of light may occur at the interface of the light-diffusion section 41 and the substrate 39 when incident light from the light incident end surface 41b is emitted from the light-diffusion section 41. In this case, there is a concern that a trouble that a desired viewing angle cannot be obtained, a quantity of emitted light is reduced, or the like is caused.

Figure 3:
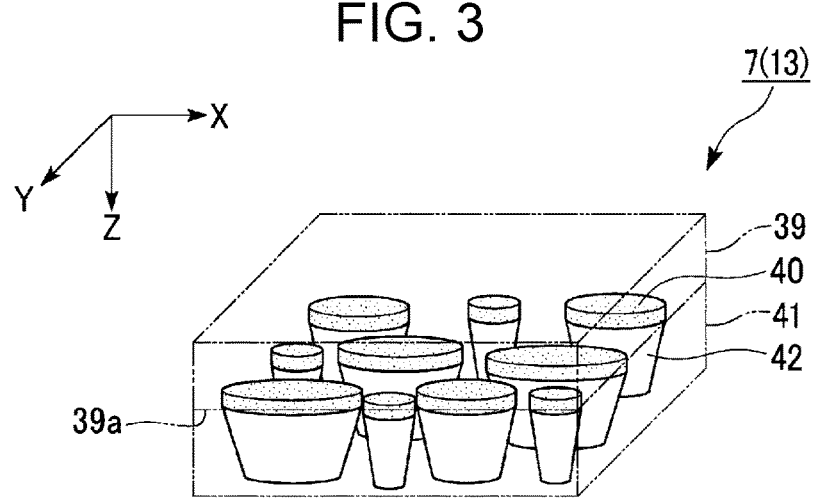
FIG. 3 is a schematic view of a light-control member.
Figure 4:
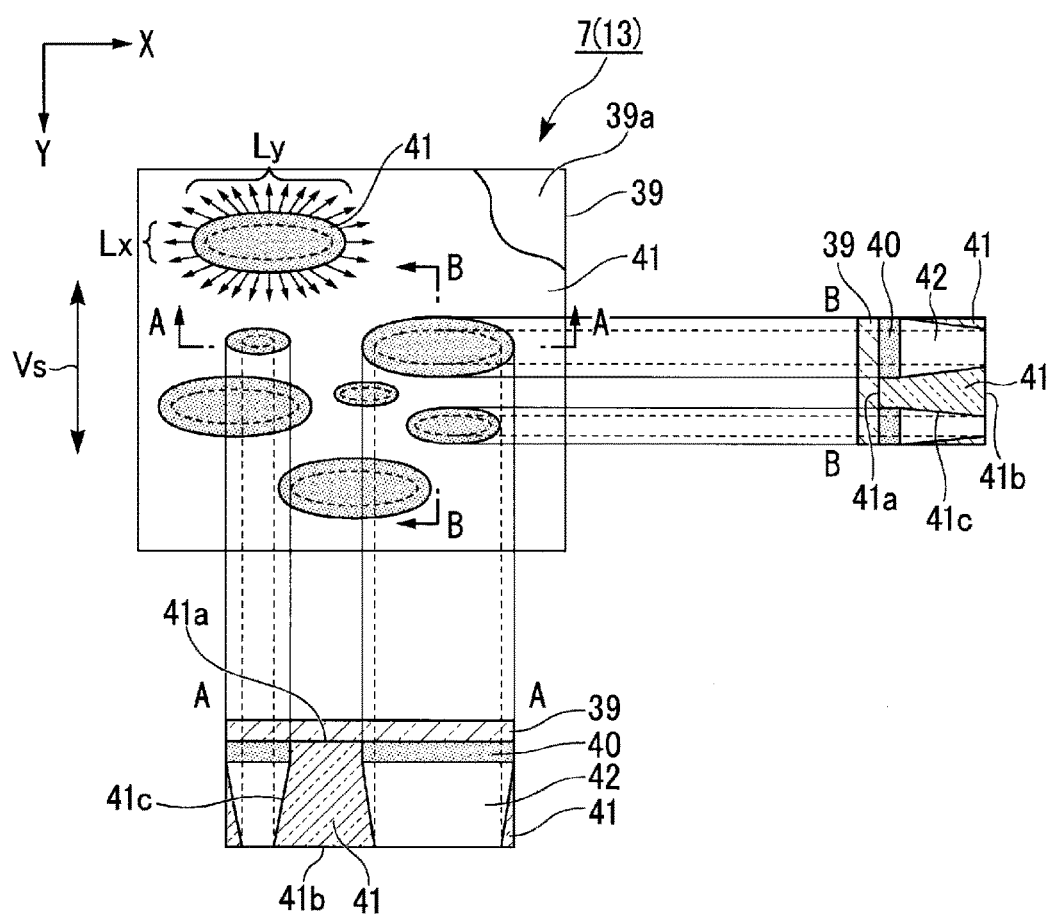
FIG. 4 illustrates the light-control member, in which an upper left part is a plan view thereof, a lower left part is a sectional view taken along an A-A line of the plan view in the upper left part, and an upper right part is a sectional view taken along a B-B line of the plan view in the upper left part.

FIG. 3 is a schematic view of the light-control member 13. In FIG. 4, an upper left part is a plan view of the light-control member 13. A lower left part is a sectional view taken along an A-A line of the plan view in the upper left part. An upper right part is a sectional view taken along a B-B line of the plan view in the upper left part.

In the light-control member 13 of the present embodiment, a plurality of light-shielding layers 40 are provided scattered over the inner surface 39a of the substrate 39, as illustrated in the upper left part in FIG. 3. Each of the light-shielding layers 40 is an elongated ellipse in planar shape as viewed from the normal direction of the substrate 39. Each of the light shielding layers 40 has a major axis and a minor axis. Here, the major axis is the longest axis in the planar shape of the light shielding layer 40 as viewed from the normal direction of the substrate 39. The minor axis is the shortest axis in the planar shape of the light shielding layer 40 as viewed from the normal direction of the substrate 39. A ratio of the length of the minor axis to the length of the major axis in each of the light shielding layers 40 is substantially equal in the light-control member 13 of the present embodiment.

As illustrated in the lower left part and upper right part in FIG. 4, a portion corresponding to a portion below the light-shielding layer 40 serves as the hollow portion 42 having an elliptical frustum shape. The light-control member 13 has a plurality of hollow portions 42. The light-diffusion section 41 is provided continuously in the portion other than portions of the plurality of hollow portions 42.

In the light-control member 13 of the present embodiment, the major axis direction of the ellipses having the planar shape of the light-shielding layers 40 (hereinafter, also referred to as a major axis direction of the light-shielding layers 40) substantially follows the X-direction. The minor axis direction of the ellipses having the planar shape of the light-shielding layers 40 (hereinafter, also referred to as a minor axis direction of the light-shielding layers 40) substantially follows the Y-direction. Accordingly, in consideration of the orientation of the reflective surfaces 41c of the light-diffusion section 41, a proportion of the reflective surfaces 41c following the X-direction is greater than a proportion of the reflective surfaces 41c following the Y-direction in the reflective surfaces 41c of the light-diffusion section 41. Thus, a quantity of light Ly reflected on the reflective surfaces 41c following the X-direction and diffused in the Y-direction is greater than a quantity of light Lx reflected on the reflective surfaces 41c following the Y-direction and diffused in the X-direction.

Accordingly, an azimuthal direction Vs in which the diffusivity of the light-control member 13 is the strongest is the Y-direction, which is the minor axis direction of the light-shielding layers 40. The polar angle direction may be set freely. Definitions of the polar angle and azimuthal angle will be described below.

However, when the light-shielding layer 40 is circular in planar shape, the proportion of the reflective surfaces following the X-direction and the proportion of the reflecting surfaces following the Y-direction are equal in the reflective surfaces 41c of the light-diffusion section 41. Therefore, the light reflected on the reflective surfaces following the X-direction and diffused in the Y-direction becomes equal to the light reflected on the reflective surfaces following the Y-direction and diffused in the X-direction. That is, the reflection of light from the reflective surfaces 41c is isotropic as viewed from the normal direction of the substrate 39. Accordingly, there is no azimuthal direction in which the diffusivity of the light-diffusion section 41 is the strongest.

Figure 5:
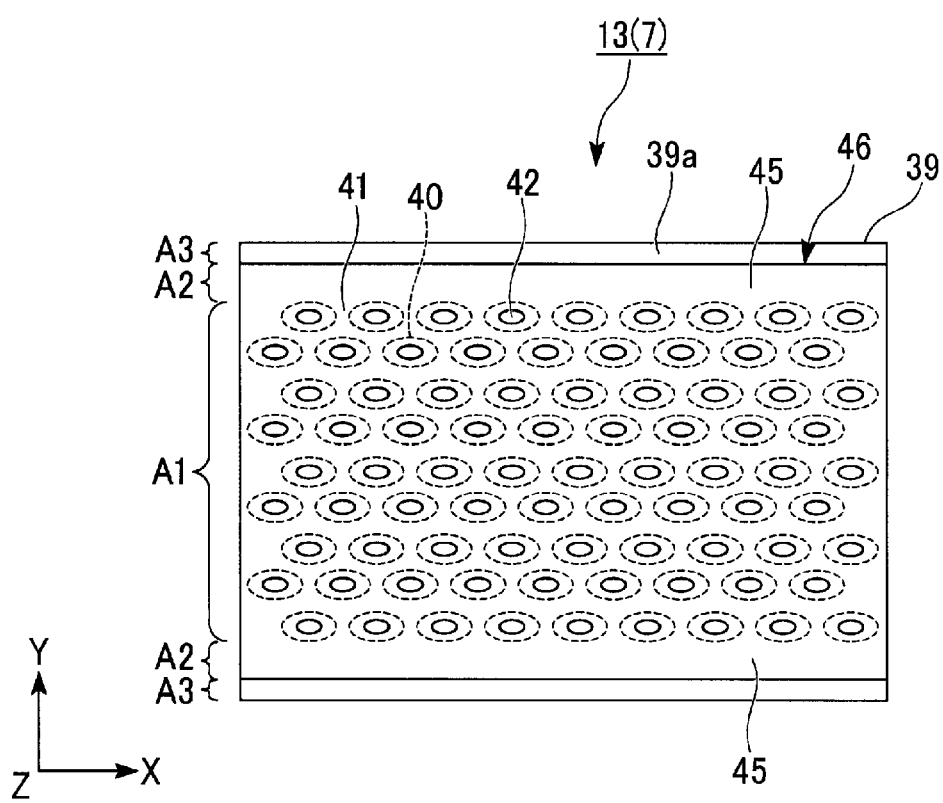
FIG. 5 is a plan view schematically illustrating a schematic configuration of the light-control member when viewed from a light-diffusion section side.

FIG. 5 is a plan view schematically illustrating a schematic configuration of the light-control member when viewed from the light-diffusion section side. Note that, in FIG. 5, the plurality of light-shielding layers 40 having the same size are arranged in a regular manner for sake of convenience, but are actually formed randomly with an elongated elliptical shape in planar shape.

As illustrated in FIG. 5, the light-control member 13 has the plurality of light-shielding layers 40 formed in the first area A1 in the one surface 39a of the substrate 39, the light-diffusion section 41 formed so as to surround the plurality of light-shielding layers 40, and the support section 45 formed in the second area A2.

A large number of light-shielding layers 40 are formed only in the first area A1 set on the one surface 39a of the substrate 39.

The light-diffusion section 41 is formed in an area other than an area where the light-shielding layers 40 are formed in the first area A1. The light-diffusion section 41 has the hollow portions 42 at positions corresponding to the light-shielding layers 40. In the state of the light-control member 13 alone, the hollow portions 42 are open on the surface opposite to the substrate 39 in the light-diffusion section 41 (side on the liquid crystal panel 4 side in assembly).

The support section 45 is provided in each of the second areas A2 positioned in each outer side in the lateral direction of the first area A1 and is formed integrally with the light-diffusion section 41. The support section 45 is formed on the inner side of each end in the lateral direction of the substrate 39. In the third areas A3 on the inner surface 39a of the substrate 39, neither the light-shielding layer 40 nor the support section 45 is formed and a part of the inner surface 39a is exposed.

A width in the Y-direction of the support section 45 in the second area A2 is wider than a width of the light-diffusion section 41 present between the hollow portions 42 (a maximum separation distance between the neighboring light-shielding layers 40). Since no light-shielding layer 40 is formed in the second area A2, neither the hollow portion 42 is present therein. That is, it is configured so that a formation area of the support section 45 per unit area in the second area A2 is greater than a formation area of the light-diffusion section 41 per unit area in the first area A1.

Figure 6A:
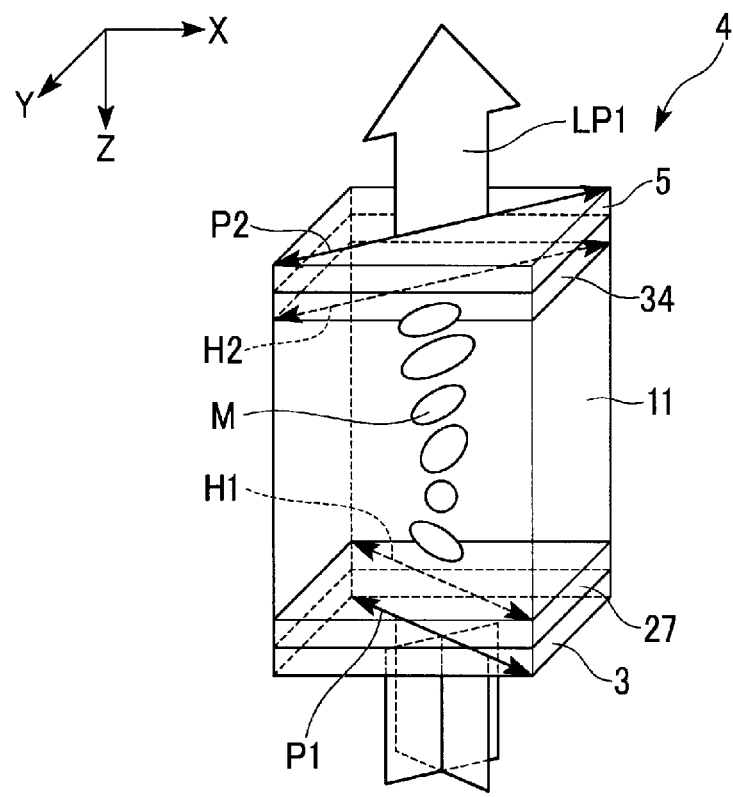
FIG. 6A illustrates a state when no voltage is applied to the liquid crystal panel (voltage non-application state).
Figure 6B:
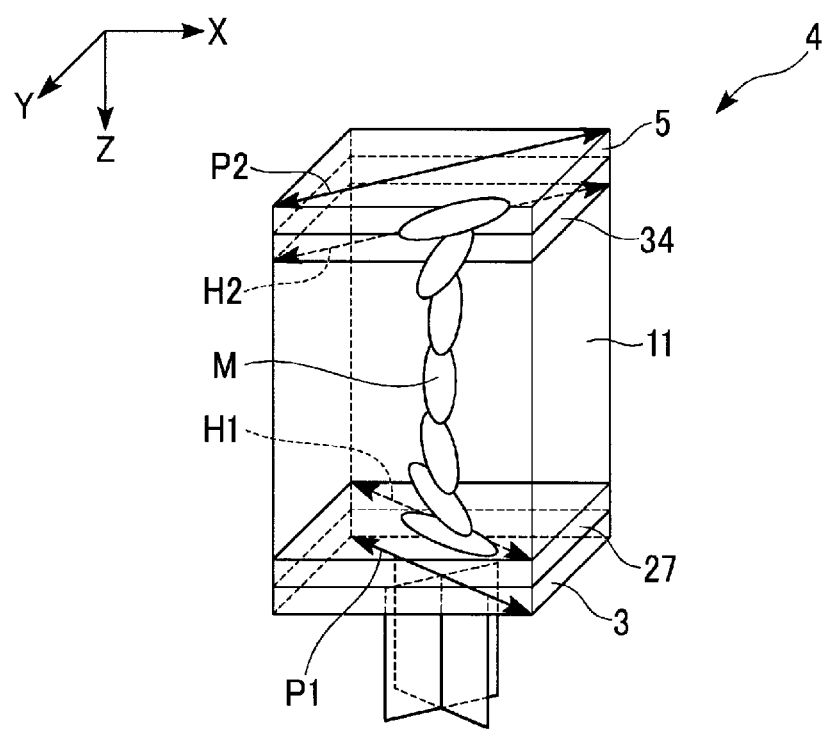
FIG. 6B illustrates a state when a constant voltage is applied to the liquid crystal panel (voltage application state).

FIG. 6A and FIG. 6B are schematic views for explaining operations of the liquid crystal panel 4.

FIG. 6A illustrates a state when no voltage is applied (voltage non-application state) to the liquid crystal panel 4 (between the pixel electrode 25 and the counter electrode 33 illustrated in FIG. 2). FIG. 6B illustrates a state when a certain voltage is applied (voltage application state) to the liquid crystal panel 4. Note that, a symbol M in FIG. 6A and FIG. 6B represents liquid crystal molecules making up the liquid crystal layer 11. A transmission axis P1 of the first polarizer 3 and a transmission axis of the second polarizer 5 are in an arrangement of crossed Nicols.

In the voltage non-application state, the liquid crystal molecules M are in a 90° twisted state between the alignment film 27 and the alignment film 34 as illustrated in FIG. 6A. At this time, the plane of polarization of linearly polarized light passing through the first polarizer 3 having the transmission axis P1 in the 135° to 315° direction rotates 90° due to the optical rotation properties of the liquid crystal layer 11. Thereby, the linearly polarized light which has passed through the first polarizer 3 passes through the second polarizer 5 having the transmission axis P2 in the 45° to 225° direction. Consequently, in the voltage non-application state, white display is provided.

In the voltage application state, the liquid crystal molecules M are in an erect state in a direction along an electric field between the alignment film 27 and the alignment film 34 as illustrated in FIG. 6B. At this time, the plane of polarization of linearly polarized light passing through the first polarizer 3 having the transmission axis P1 in the 135° to 315° direction does not rotate. Thus, the linearly polarized light which has passed through the first polarizer 3 does not pass through the second polarizer 5 having the transmission axis P2 in the 45° to 225° direction. Consequently, in the voltage application state, black display is provided.

As described above, in the liquid crystal panel 4, white display and black display are able to be switched by controlling application/non-application of voltage to each pixel, and thus, an image is able to be displayed.

Figure 7:
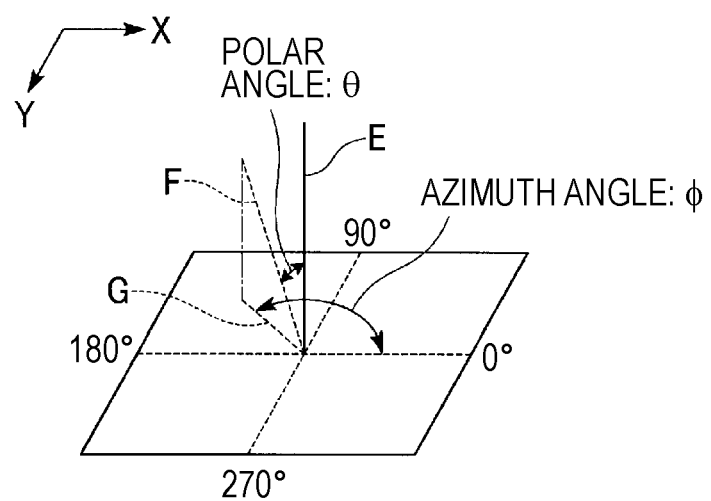
FIG. 7 is a view for explaining definitions of an azimuth angle and a polar angle.

FIG. 7 is a view for explaining definitions of a polar angle and an azimuth angle.

As illustrated in FIG. 7, an angle of a viewing direction F of an observer, which is set based on a normal direction E of a screen of the liquid crystal display device 1, is a polar angle θ. An angle of a line segment G which is obtained when the viewing direction F of the observer based on a positive direction (direction of 0°) on the x-axis is projected on the screen is an azimuth angle φ.

Figure 8A:
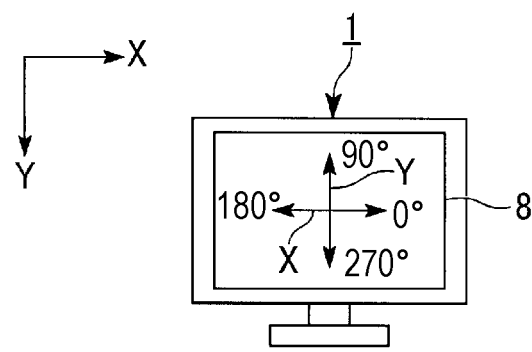
FIG. 8A is a front view of the liquid crystal display device.
Figure 8B:
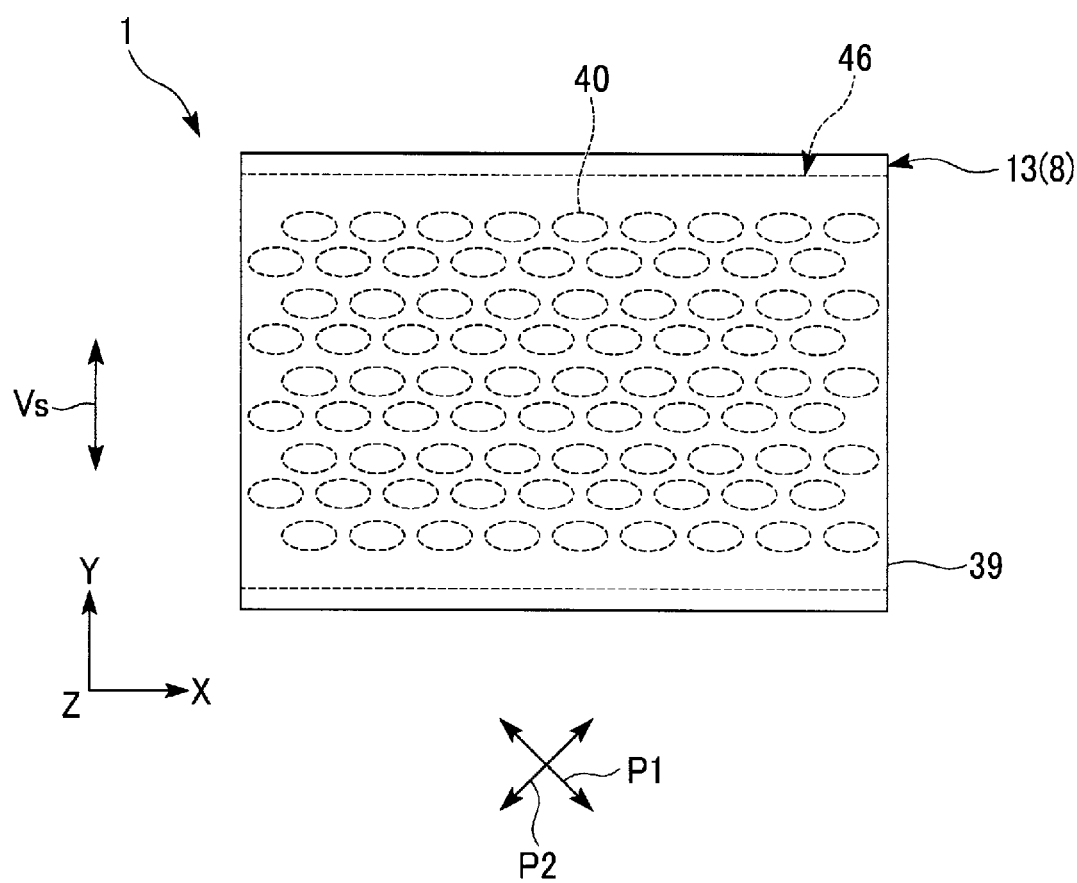
FIG. 8B illustrates an arrangement relation between an azimuthal direction Vs in which diffusivity of a light-control member 13 is relatively strong and transmission axes of polarizers (a transmission axis P1 of a first polarizer 3 and a transmission axis P2 of a second polarizer 5) in the front view of the liquid crystal display device 1.

FIG. 8A is a front view of the liquid crystal display device and FIG. 8B illustrates an arrangement relation between an azimuthal direction Vs in which diffusivity of the light-control member 13 is relatively strong and transmission axes of the polarizers (the transmission axis P1 of the first polarizer 3 and the transmission axis P2 of the second polarizer 5) in the front view of the liquid crystal display device 1.

As illustrated in FIG. 8A, the azimuth angle φ in the horizontal direction (x-axis direction) on the screen of the liquid crystal display device 1 is set to a direction of 0° to 180°. To state simply, the direction of the azimuthal angle φ 0° to 180° is the right-and-left direction. Specifically, the direction of azimuth angle φ 0° to 180° is a direction following an axis parallel to the ground. The azimuth angle φ in the vertical direction (y-axis direction) is set to a direction of 90° to 270°. To state simply, the direction of the azimuth angle φ 90° to 270° is the up-and-down direction. Specifically, the direction of azimuth angle φ 90° to 270° is a direction following an axis perpendicular to the ground.

A frontal shape of the liquid crystal display device 1 to which the light-control member 13 is bonded is rectangular in the horizontal direction (landscape) as illustrated in FIG. 8B. The azimuthal direction Vs in which diffusivity of the light-control member 13 is relatively strong is the azimuthal direction in which a luminance viewing angle of the liquid crystal display body 8 is relatively narrow (the direction of azimuthal angle φ 90° to 270°. Accordingly, the intensity of diffusion in the vertical direction of the liquid crystal display device 1 increases, so that vertical visibility is further improved.

In the present embodiment, the azimuthal direction Vs in which diffusivity of the light-control member 13 is relatively strong is almost parallel to short sides of the substrate 39. That is, it is set in the present embodiment that an angle between the azimuthal direction Vs in which diffusivity of the light-control member 13 is relatively strong and the transmission axis P2 of the second polarizer 5 is almost 45°. It is further set that an angle between the azimuthal direction Vs in which diffusivity of the light-control member 13 is relatively strong and the transmission axis P1 of the first polarizer 3 is almost 45°.

Note that, the azimuthal direction Vs in which diffusivity of the light-control member 13 is relatively strong and the short sides of the substrate 39 do not need to coincide with each other perfectly or in parallel, and are only required to be almost in parallel. It is generally considered that in the assembly process of the liquid crystal display device 1, shift in a rotation direction of the alignment of the liquid crystal panel and the polarizer is within about 5°. Therefore, the case where the azimuthal direction Vs in which diffusivity of the light-control member 13 is relatively strong and the short sides of the substrate 39 are shifted by about 5° is also included in the technical scope of the invention.

Next, a method for manufacturing the light-control member will be described.

Figure 9:
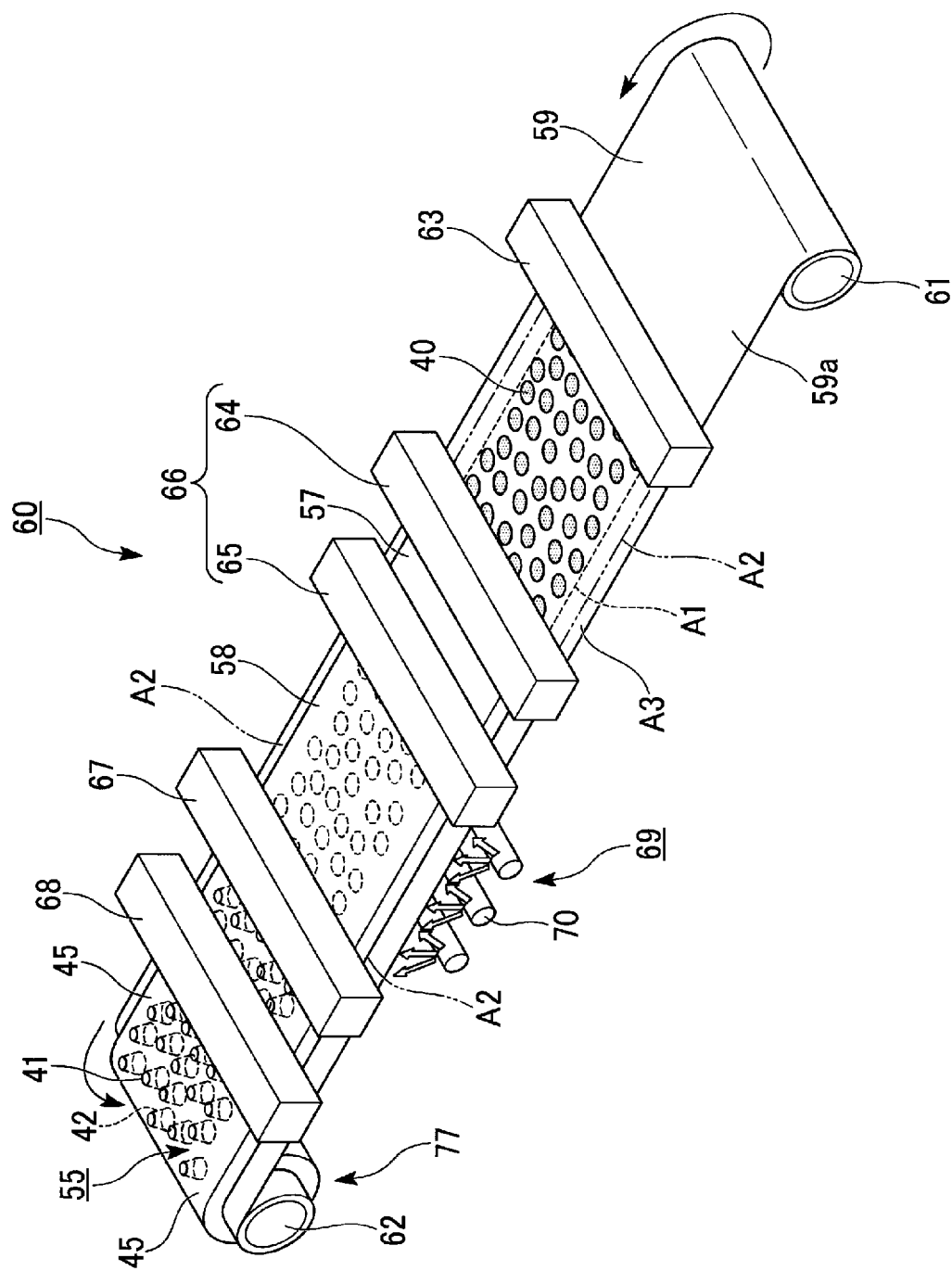
FIG. 9 is a schematic structural view illustrating one example of a device for manufacturing a light-control member used in a method for manufacturing a light-control member of a first embodiment.

FIG. 9 is a schematic structural view illustrating one example of a device for manufacturing the light-control member used for the method for manufacturing the light-control member of the present embodiment.

A manufacturing device 60 illustrated in FIG. 9 feeds a long substrate (first substrate) 59 by a roll-to-roll process while performing various processing. First, the manufacturing device 60 forms a roll-shaped mother roll (mother substrate) 55 having many areas in which light-control members are formed. By dicing the mother roll 55, a plurality of light-control members are obtained.

As illustrated in FIG. 9, the manufacturing device 60 has a feeding roller 61 for feeding the substrate 59 at one end and a winding roller 62 for winding up the substrate 59 at the other end. It is configured so that the substrate 59 moves from the feeding roller 61 side to the winding roller 62 side. Above the substrate 59, a printing device 63, a negative photosensitive resin layer forming device 66 constituted by a bar coating equipment 64 and a first drying device 65, a developing device 67, a second drying device 68, and the like are arranged in sequence from the feeding roller 61 side to the winding roller 62 side. An exposure device 69 is arranged below the substrate 59.

The printing device 63 prints the light-shielding layers 40 formed of black resin on the substrate 59.

The bar coating equipment 64 applies a negative photosensitive resin (photosensitive resin layer) 57 having light transmissivity on the light-shielding layers 40 when forming the light-diffusion section 41 made of the negative photosensitive resin 57 having light transmissivity.

The first drying device 65 dries the negative photosensitive resin 57 after the application to provide a coating 58 when forming the light-diffusion sections 41 made of the negative photosensitive resin 57 having light transmissivity.

Note that, the negative photosensitive resin layer forming device 66 constituted by the bar coating equipment 64 and the first drying device 65 is exemplified in the present embodiment, but the present embodiment is not limited thereto. When the light-diffusion section is formed from a dry film resist, a laminating device for laminating the dry film resist on the substrate 59 is used as the negative photosensitive resin layer forming device 66.

The developing device 67 develops the negative photosensitive resin 57 (coating 58) after exposure with a developing solution. The second drying device 68 dries the substrate 59 on which the light-diffusion section 41 formed of the developed negative photosensitive resin 57 (coating 58) has been formed.

The exposure device 69 performs exposure of the coating 58 of the negative photosensitive resin 57 from the substrate 59 side. The exposure device 69 includes a plurality of light sources 70.

The exposure device 69 is arranged on a surface opposite to one surface 59a of the substrate 59 on which the light-shielding layers 40 and a negative photosensitive resin layer 58 are formed. The exposure device 69 performs exposure for the negative photosensitive resin layer 58 by irradiating the negative photosensitive resin layer 58 with diffused light formed of ultraviolet light obliquely to the direction normal to the rear surface of the substrate 59 (the surface opposite to the one surface 59a) from two directions through the substrate 59 of the area other than the formation area of the light-shielding layers 40.

Typically, resins such as thermoplastic polymers or thermosetting resins, and photopolymerizable resins are used for the substrate 59 of the mother roll 55. It is possible to use a substrate made of suitable transparent resins (having light transmissivity) formed of acryl-based polymers, olefin-based polymers, vinyl-based polymers, cellulose-based polymers, amide-based polymers, fluorine-based polymers, urethane-based polymers, silicone-based polymers, imide-based polymers, or the like.

For example, a substrate 59 made of transparent resins of, for example, tri-acetyl cellulose (TAC) films, polyethylene terephthalate (PET) films, cyclo olefin polymer (COP) films, polycarbonate (PC) films, polyethylene naphthalate (PEN) films, polyether sulfone (PES) films, polyimide (PI) films, or the like is preferably used.

The substrate 59 serves as a foundation used for applying materials of the light-shielding layers 40 and the light-diffusion section 41 and have a heat resistance and a mechanical strength to withstand a heat processing step in the manufacturing process. However, it is preferable that the thickness of the substrate 59 is thin to the extent that does not impair the heat resistance or the mechanical strength. The substrate 59 also preferably has a total light transmittance of 90% or higher pursuant to the requirement of JIS K7361-1. With a total light transmittance of 90% or higher, sufficient transparency is obtained.

The light-shielding layers 40 are formed randomly in a predetermined area of the one surface 59a of the substrate 59 as illustrated in FIG. 9. In FIG. 9, the plurality of light-shielding layers 40 having the same size are arranged in a regular manner for sake of convenience, but are actually formed randomly with an elongated elliptical shape in planar shape.

For example, the light shielding layers 40 are made of organic material having light absorbency and photosensitivity, such as black resist. In addition, a metal film of chromium (Cr), or a multilayer film of Cr/Cr oxide, pigments and dyes used in black inks, black inks obtained by mixing multicolor inks, and the like may be used to form the light-shielding layers 40. Other than the above material, material having light-shielding effect may be used for the light-shielding layers 40.

The thickness of the light-shielding layers 40 is set, for example, to be smaller than the height between the light incident end surface and the light emitting end surface of the light-diffusion section 41.

(Method for Manufacturing Light-Control Member)

Next, the process for manufacturing the light-control member in the present embodiment will be described. Here, a method for manufacturing the light-control member will be described focusing on the process of manufacturing a mother roll having many areas in which optical films are to be formed.

FIG. 10 is a flowchart illustrating the method for manufacturing the light-control member. FIG. 11A to FIG. 11C and FIG. 12A to FIG. 12D are sectional views for explaining in order the process of manufacturing the light-control member (mother roll). Note that, FIG. 12A to FIG. 12D are sectional views of the substrate 39 in the lateral direction.

As illustrated in FIG. 11A to FIG. 11C and FIG. 12A to FIG. 12D, the row roll 55 is manufactured with various processing applied mainly by the printing device 63, the negative photosensitive resin layer forming device 66, the developing device 67, and the second drying device 68 in this order.

Figure 11A:
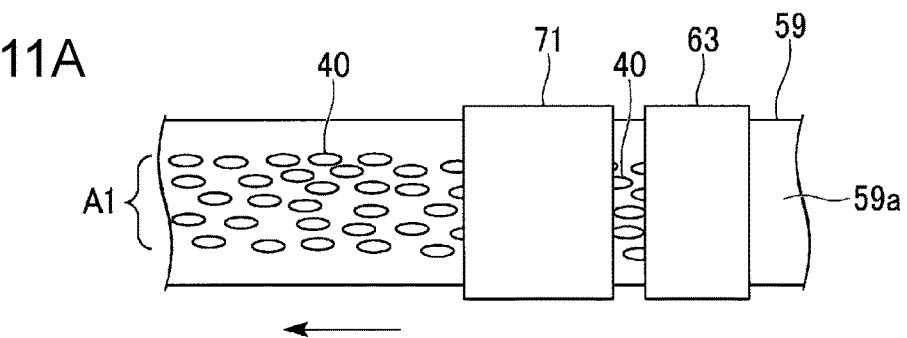
FIG. 11A is a first plan view for explaining in order a process of manufacturing the light-control member (mother roll).
Figure 12A:
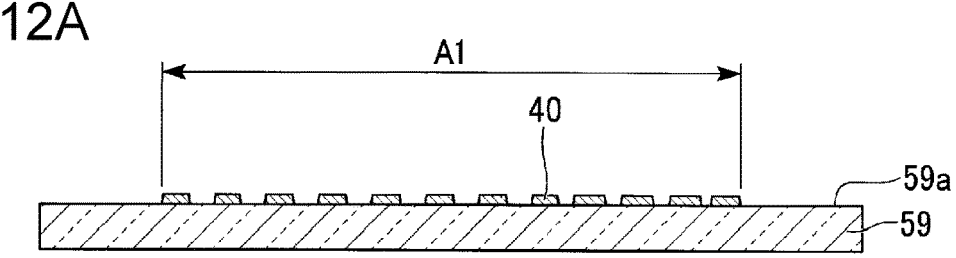
FIG. 12A is a first sectional view of a substrate in a lateral direction for explaining in order the process of manufacturing the light-control member (mother roll).

As illustrated in FIG. 11A and FIG. 12A, first, a large number of light-shielding layers 40 are formed by the printing device 63 in the first area A1 at a center portion in a lateral direction of the one surface 59a of the long substrate 59 (light-shielding layer formation step: S1). The neighboring light-shielding layers 40 are not formed at a regular or periodical interval (pitch) but formed randomly. In the light-shielding layer formation step, the light-shielding layers 40 are formed only in the first area A1 and not formed in the second area A2 or the third area A3.

Thereafter, the light-shielding layers 40 are dried by a drying device 71 (not illustrated in FIG. 9).

Note that, the light-shielding layers 40 are formed by a print method in the present embodiment, but there is no limitation thereto. In addition, the light-shielding layers 40 may be formed by photolithography using a black negative resist. In this case, a light-absorbing positive resist is also able to be used instead by means of a photomask having inverted patterns of an aperture pattern and a light shielding-pattern. Alternatively, the light-shielding layers 40 may be directly formed by a vapor deposition method, an ink-jetting method, or the like.

Figure 11B:
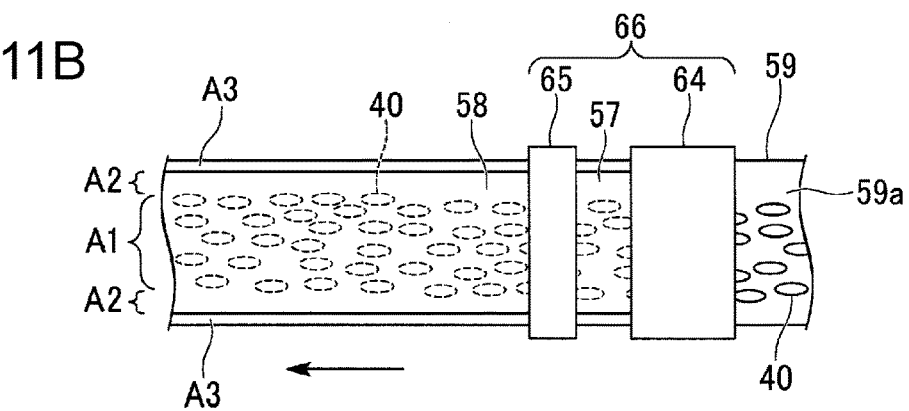
FIG. 11B is a second plan view for explaining in order the process of manufacturing the light-control member (mother roll).

Next, as illustrated in FIG. 11B and FIG. 12B, the negative photosensitive resin 57 is applied by the bar coating equipment 64 on the one surface 59a of the substrate 59 so as to surround the large number of light-shielding layers 40. Specifically, the negative photosensitive resin 57 is applied continuously over the first area A1 which is in the inner side of both ends of the substrate 39 and in which the large number of light-shielding layers 40 are formed and the second area A2 positioned on the outer side of the first area A1 (outer side following the lateral direction of the substrate 39). That is, the negative photosensitive resin 57 is not applied to the third areas A3 each of which is on each end of the lateral direction of the substrate 59. By applying the negative photosensitive resin 57 to the inner sides of both ends of the lateral direction of the substrate 59, it is possible to prevent the bar coating equipment 64 from being contaminated by the overflowed resin.

For the negative photosensitive resin 57, organic material having light transmissivity and photosensitivity, such as acrylic resin or epoxy resin, is used. In the present embodiment, one having a refractive index equal to that of the substrate 59 is preferably used for the negative photosensitive resin 57.

Note that, neither the light-shielding layer 40 nor the negative photosensitive resin layer 58 is formed in the third areas A3 in a negative photosensitive resin formation step.

In the present embodiment, the negative photosensitive resin 57 is applied by using the bar coating equipment 64, but there is no limitation thereto. In addition, the negative photosensitive resin 57 may be formed by using a slit coater method, a spin coating method, a print method, or the like.

Next, the negative photosensitive resin 57 after the application is dried by the first drying device 65 to form the coating (hereinafter, referred to as a "negative photosensitive resin layer") 58 (negative photosensitive resin formation step: S2).

Then, as illustrated in FIG. 12C, by the exposure device 69, the negative photosensitive resin layer 58 is irradiated with diffused light by using the plurality of light-shielding layers 40 which are elliptical in planar shape as a mask from the surface opposite to the one surface 59a of the substrate 59, on which the light-shielding layers 40 and the negative photosensitive resin layer 58 are formed, and the negative photosensitive resin layer 58 is exposed (negative photosensitive resin layer exposure step: S3).

By irradiating the negative photosensitive resin layer 58 through the substrate 59 of the area other than the formation area of the light-shielding layers 40 with diffused light formed of ultraviolet light by the exposure device 69, the negative photosensitive resin layer 58 is radially exposed so as to spread outside from a non-formation area of the light-shielding layers 40.

Figure 11C:
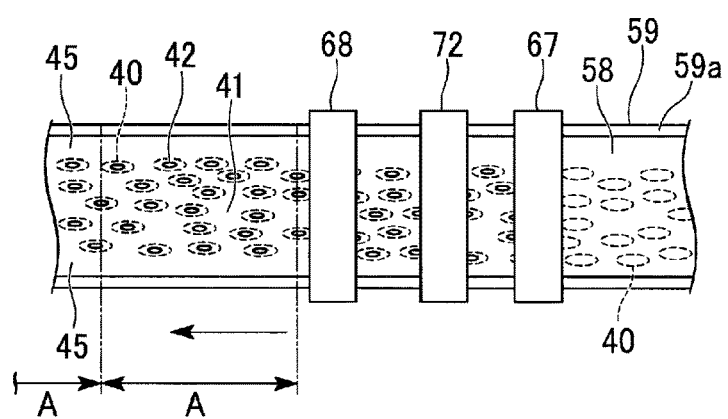
FIG. 11C is a third plan view for explaining in order the process of manufacturing the light-control member (mother roll).

Next, as illustrated in FIG. 11C, the negative photosensitive resin layer 58 is developed by the developing device 67 with the use of a dedicated developing solution (negative photosensitive resin layer development step: S4).

After the development ends, the negative photosensitive resin layer 58 is cleaned by a cleaning device 72 with the use of a dedicated rinsing liquid (such as purified water). Then, the negative photosensitive resin layer 58 is dried at 80° by the second drying device 68 to remove the remaining developing solution, rinsing liquid, and water (negative photosensitive resin layer drying step: S5).

In this manner, the light-diffusion section 41 having a plurality of hollow portions 42 is formed in the first area A1 of the substrate 39 and the support sections 45 are formed in the second areas A2 as illustrated in FIG. 12D.

As described above, when the negative photosensitive resin layer 58 is radially exposed so as to spread outside from the non-formation area of the light-shielding layers 40, the hollow portions 42 each having a forward tapered shape are formed. The light-diffusion section 41 has an inversely tapered shape. Note that, a part of the one surface 59a of the substrate 59 is exposed in the third areas A3.

As described above, the mother roll 55 of the light-control member 13 is manufactured.

The manufactured mother roll 55 is temporarily wound up by the winding roller 62. Then, the mother roll 55 which is let out from the winding roller 62 is cut into a predetermined size according to the liquid crystal panel to dice the light-control member 13 (dicing step: S6). Here, by cutting the mother roll 55 for each light control member formation area A (FIG. 11C), a plurality of light-control members 13 corresponding to a planar view size of the liquid crystal display device described below are obtained.

As above, the light-control members 13 are completed through the aforementioned steps.

The cut-off light-control member 13 is then bonded to the second polarizer 5 of the liquid crystal display body 8. At this time, the light-control member 13 is bonded to the liquid crystal display body 8 in a state where the substrate 39 faces the viewing side and the light-diffusion section 41 opposes the second polarizer 5. In this case, as illustrated in FIG. 1, the light-control member 13 is provided in such a manner that the first area A1 in which the light-diffusion section 41 is formed is positioned in a display area R of the liquid crystal display body 8 and the second areas A2 in which the support sections 45 are formed are positioned in an area other than the display area R.

In this manner, the mother roll 55 as a base material of the light-control member 13 is wound up by the winding roller 62 of the manufacturing device 60 in the manufacturing process as illustrated in FIG. 9. Since the light-diffusion section 41 formed on the substrate 59 has predetermined film thickness, in the case of the conventional configuration (in the case of having no support section 45), there is a level difference between the substrate and the light-diffusion section on both sides in the lateral direction of the substrate. When the substrate having such a level difference is lapped and wound up by the winding roller, load concentrates on edge portions on both sides in the lateral direction of the light-diffusion section having a plurality of hollow portions, which serve as edge portions of the level difference. That is, when the substrate has a minute uneven shape caused by the light-diffusion section at both end sides in the lateral direction of the substrate, the load concentrates thereon, so that the light-diffusion section is easily deformed.

In this manner, when the hollow portions 42 are formed up to both side portions in the lateral direction of the light-diffusion section 41, an area receiving the load becomes narrow, so that a great pressure is applied to the light-diffusion section 41 in the case of winding-up and the light-diffusion section 41 may be deformed. In a case where an area in which the light-diffusion section 41 and the substrate 59 are closely adhered to each other is small in an outer peripheral portion of the light-diffusion 41, the light-diffusion section 41 may be separated from the substrate 59 when a peripheral portion of the light-diffusion section 41 is subjected to force.

Against this, in the present embodiment, no hollow portion 42 is formed in the edge portions on both sides in the lateral direction of the light-diffusion section 41. In terms a formation area of the light-diffusion section 41 in the substrate 39, a formation area of the light-diffusion section 41 per unit area in the first area A1 is larger than a formation area of the support section 45 per unit area in the second area A2. That is, it is configured so that the width of the light-diffusion section 41 in the second area A2 is greater than an arrangement interval between the light-shielding layers 40 in the first area A1.

In this manner, in a case where the area receiving the load becomes large, a great pressure is not applied to the light-diffusion section 41 even when the substrate 59 is wound up by the winding roller 62. When the load is dispersed in the support sections 45 provided on both sides of the light-diffusion section 41, the edge portions of the light-diffusion section 41 are prevented from being deformed. Thereby, the light-control member 13 having excellent optical performance (light diffusivity) is provided.

In addition, the area in which the light-diffusion section 41 and the substrate 59 are closely adhered to each other becomes large at the outer peripheral portion of the light-diffusion section 41 and the light-diffusion section 41 has the periphery portion more closely adhered to the substrate 59 and is thus prevented from being separated.

Second Embodiment

A light-control member of a second embodiment of the invention will be described below.

Note that, in the present embodiment, the same reference signs are assigned to components common with the first embodiment and detailed description thereof will be omitted.

Figure 13:
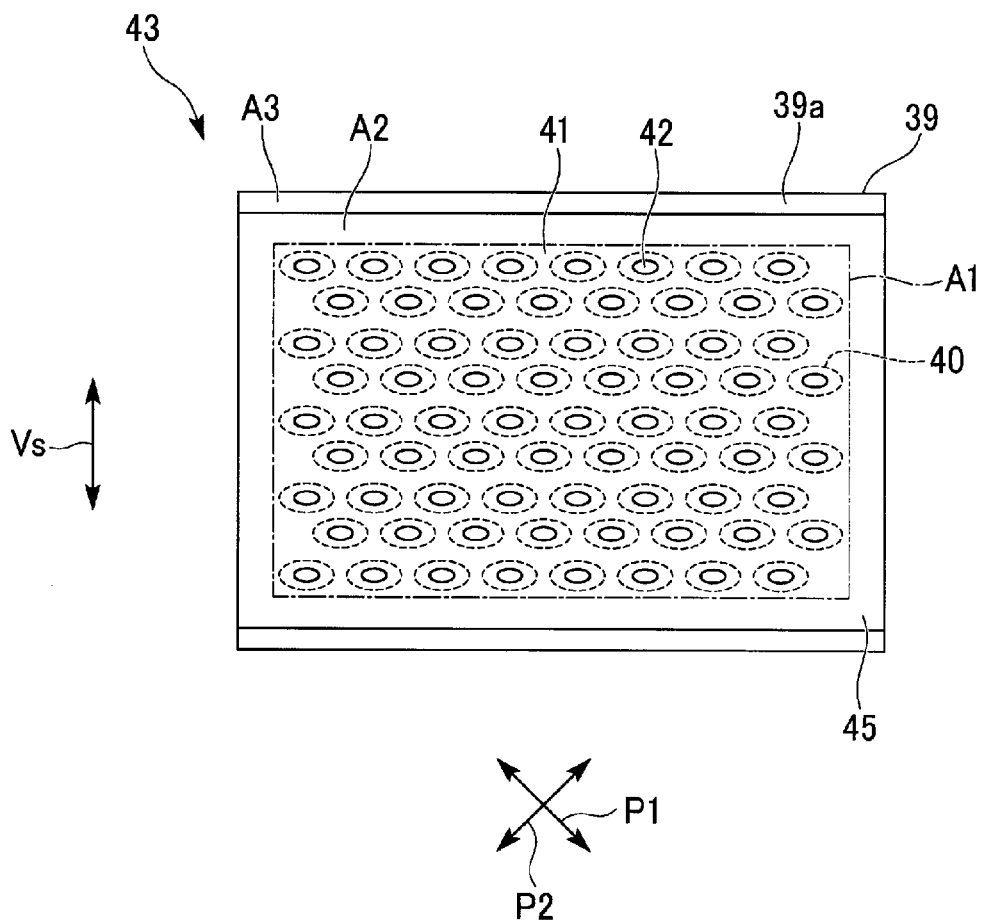
FIG. 13 is a plan view illustrating a schematic configuration of a light-control member in a second embodiment.

FIG. 13 is a plan view illustrating a schematic configuration of the light-control member in the second embodiment.

As illustrated in FIG. 13, in a light-control member 43 (light-control member 7) in the present embodiment, a second area A2 is set so as to surround the periphery of the first area A1 on the substrate 39. In the present embodiment as well, a plurality of light-shielding layers 40 are formed only in the first area A1 and not formed in the second area A2. Thus, the hollow portions 42 formed correspondingly to the light-shielding layers 40 are present only in the first area A1 and not present in the second area A2.

The support section 45 formed in the second area A2 is formed integrally with the light-diffusion section 41 in the first area A1. The light-diffusion section 41 is formed on the inner side of both ends in the lateral direction of the substrate 39 so as to expose a part of the one surface 39a of the substrate 39. As described above, the support section 45 has no hollow portion 42 and has constant thickness on the substrate 39.

(Method for Manufacturing Light-Control Member)

Next, a process for manufacturing the light-control member in the second embodiment will be described. Here, a method for manufacturing the light-control member will be described focusing on the process of manufacturing a mother roll having many areas in which optical films are to be formed.

Figure 14A:
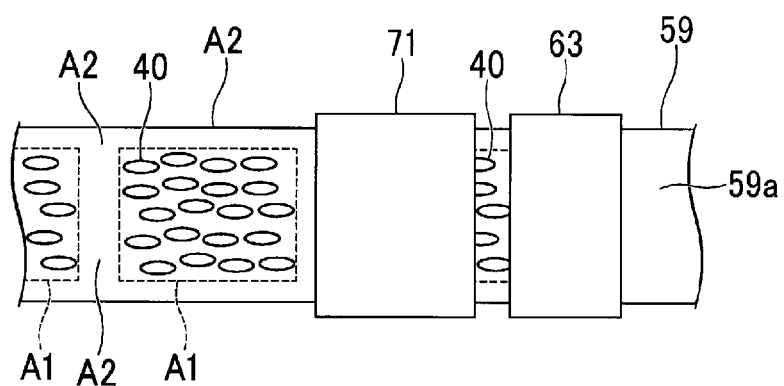
FIG. 14A is a first plan view for explaining in order a process of manufacturing a mother roll.
Figure 14B:
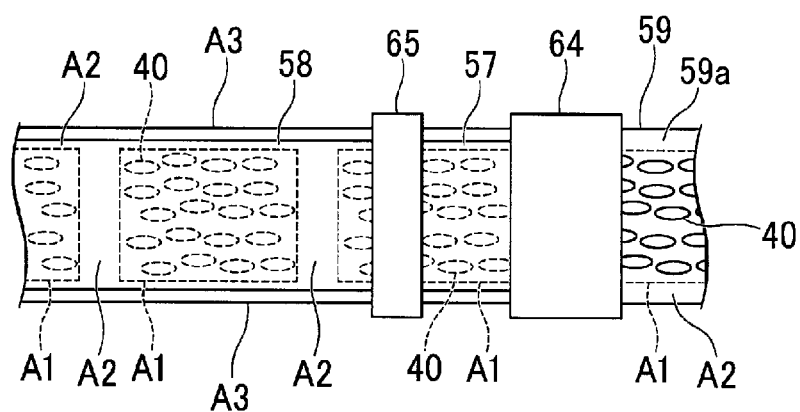
FIG. 14B is a second plan view for explaining in order the process of manufacturing the mother roll.
Figure 14C:
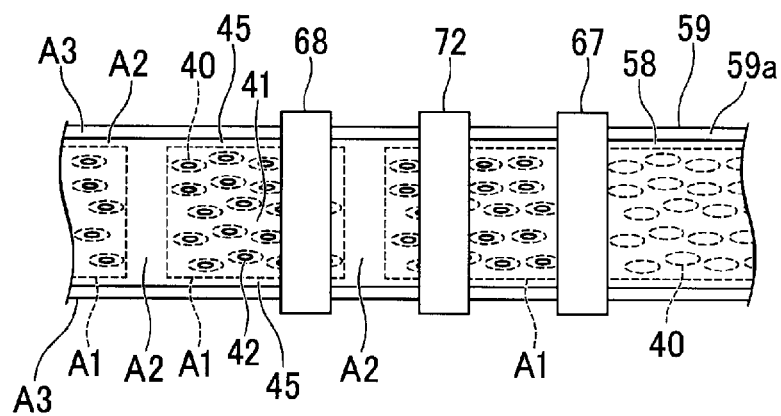
FIG. 14C is a third plan view for explaining in order the process p of manufacturing the mother roll.

FIG. 14A to FIG. 14C are plan views for explaining in order the process of manufacturing the mother roll.

Figure 15:
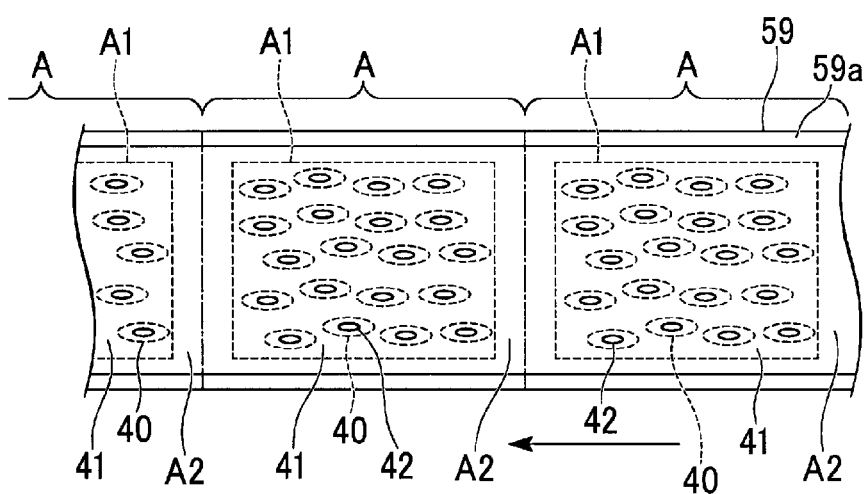
FIG. 15 illustrates a plane of the substrate in the process of manufacturing the mother roll.

FIG. 15 illustrates a plane of the substrate in the process of manufacturing the mother roll.

As illustrated in FIG. 14A, a large number of light-shielding layers 40 are formed by the printing device 63 in each of first areas A1 which are on the one surface 39a of the substrate 39 and set at a predetermined interval in a feeding direction of the substrate 59. An area between the first area A1 and the first area A1 serves as the second area in which no light-shielding layer 40 is formed and the periphery of the first area A1 is surrounded by the second area A2.

In the present embodiment, the large number of light-shielding layers 40 are formed not continuously in the feeding direction of the substrate 59 but intermittently every predetermined number of the light-shielding layers 40. The areas in which no light-shielding layer 40 is formed are thus present in the feeding direction of the substrate 59.

Thereafter, the light-shielding layers 40 formed in each of the first areas A1 are dried by the drying device 71.

Then, as illustrated in FIG. 14B, the negative photosensitive resin 57 is applied by the bar coating equipment 64 to the first areas A1 and the second areas A2 on the one surface 59a of the substrate 59 so as to cover the light-shielding layers 40. In the present embodiment as well, the negative photosensitive resin 57 is not applied to the third areas A3 on both end sides in the lateral direction of the substrate 59.

Next, the negative photosensitive resin 57 after the application is dried by the first drying device 65 to form the negative photosensitive resin layer 58.

Then, the negative photosensitive resin layer 58 is exposed by the exposure device 69 by using the light-shielding layers 40 as a mask.

Next, as illustrated in FIG. 14C, after the negative photosensitive resin layer 58 is developed by the developing device 67, the negative photosensitive resin layer 58 is cleaned by the cleaning device 72, and subsequently, post-baked by the second drying device 68. In this manner, the light-diffusion section 41 having a plurality of hollow portions 42 are formed in each of the first areas A1.

The manufactured mother roll 55 is wound up by the winding roller.

Then, the mother roller 55 is let out from the winding roller and the mother roll 55 is cut off for each area in which the light-control member 13 is formed. As illustrated in FIG. 15, for each of the light-control member formation areas A, the substrate 59 is cut off in the second area A2 having no light-shielding layer 40 formed, in the longitudinal direction of the mother roll 55. In the present embodiment, the substrate 59 is divided at a position of bisecting the second area A2 in the longitudinal direction of the mother roll 55 to obtain a plurality of light-control members 13. The light-control members 13 in a sheet shape are stacked and kept, and sequentially bonded to the liquid crystal display body.

According to the present embodiment, the second areas A2 in which no light-shielding layer 40 is formed are set on the substrate 39 so as to surround the periphery of the first area A1 in which the light-shielding layers 40 are formed. That is, the support section 45 which does not have any hollow portion 42 is provided along the periphery of the light-diffusion section 41 having many hollow portions 42. By providing the second areas A2 along not only both sides in the lateral direction but also both sides in the longitudinal direction of the first area A1, the area in which load is received increases, thus making it possible to effectively disperse the load applied to the periphery of the light-diffusion section 41 having a minute structure.

In this manner, since the periphery of the light-diffusion section 41 is reinforced by the support sections 45 which do not have the minute structure, even when the plurality of manufactured light-control members 13 are stacked and kept, the light-diffusion section 41 of the light-control member 13 in the lower side is able to be prevented from being deformed due to weight of the light-control member 13 in the upper side.

Figure 16A:
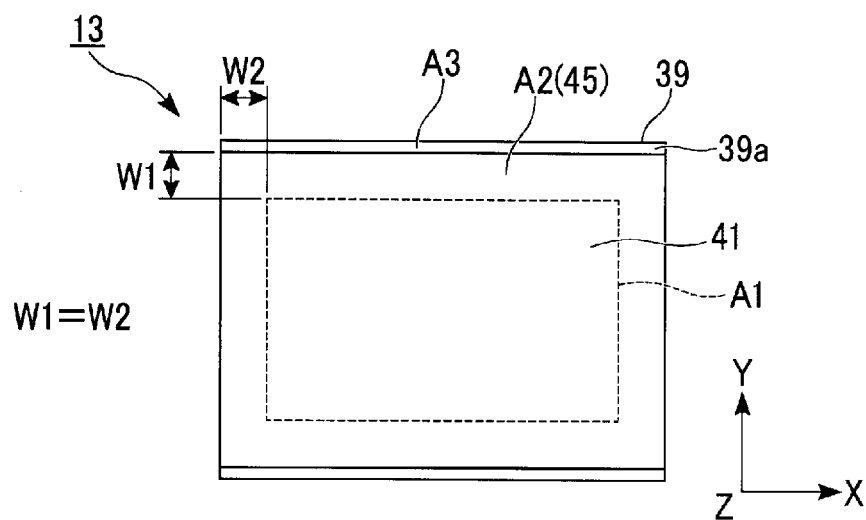
FIG. 16A is a first view illustrating a width W1 of a second area A2 in a lateral direction (Y-direction) of the substrate of the light-control member and a width W2 of the second area A2 in a longitudinal direction (X-direction) thereof.
Figure 16B:
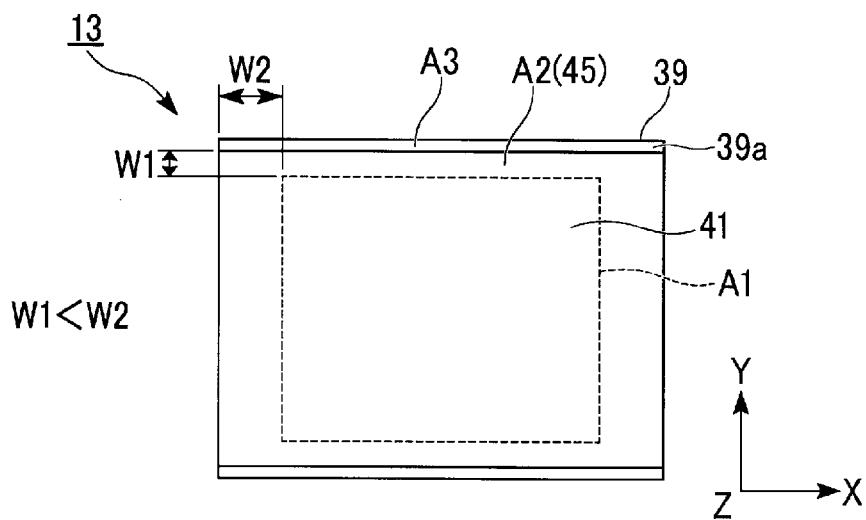
FIG. 16B is a second view illustrating the width W1 of the second area A2 in the lateral direction (Y-direction) of the substrate of the light-control member and the width W2 of the second area A2 in the longitudinal direction (X-direction) thereof.
Figure 16C:
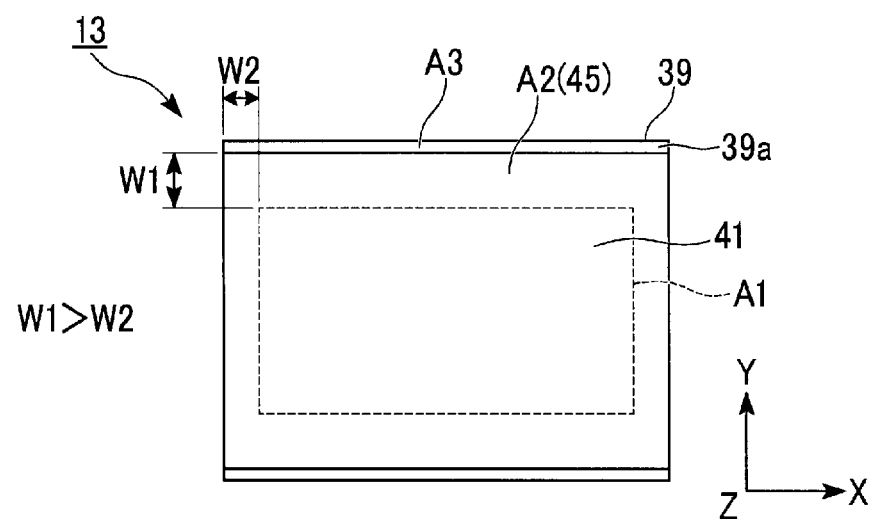
FIG. 16C is a third view illustrating the width W1 of the second area A2 in the lateral direction (Y-direction) of the substrate of the light-control member and the width W2 of the second area A2 in the longitudinal direction (X-direction) thereof.

FIG. 16A to FIG. 16C illustrate a width A1 of the second area A2 (support section 45) in the lateral direction (Y-direction) of the substrate 39 of the light-control member 13 and a width W2 of the second area A2 (support section 45) in the longitudinal direction (X-direction) thereof.

As illustrated in FIG. 16A, the present embodiment provides a configuration in which the width A1 of the second area A2 (support section 45) in the lateral direction (Y-direction) of the light-control member 13 and the width W2 of the second area A2 (support section 45) in the longitudinal direction (X-direction) thereof are equal. It may be configured so that the width W2 of the second area A2 (support section 45) is wider than the width W1 of the second area A2 (support section 45) (W1<W2) as illustrated in FIG. 16B. Alternatively, it may be configured so that the width W2 of the second area A2 (support section 45) is narrower than the width W1 of the second area A2 (support section 45) (W1>W2) as illustrated in FIG. 16C.

Note that, the configuration in which the light-shielding layer 40 is not formed at all in the second area A2 has been described in the first embodiment and the second embodiment described above. The light-shielding layer may be provided also in the second area A2 as long as the formation area of the support section 45 per unit area in the second area A2 is greater than the formation area of the light-diffusion section 41 per unit area in the first area A1.

Figure 17A:
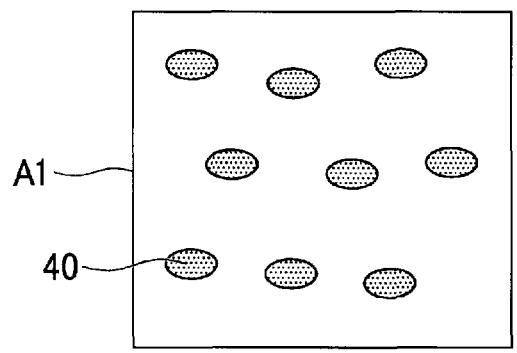
FIG. 17A illustrates a first area in which light-shielding layers are provided.
Figure 17B:
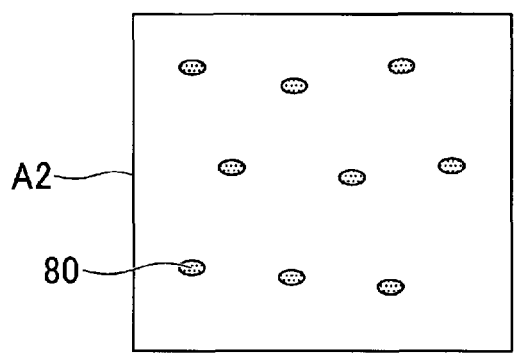
FIG. 17B is a first view for exemplifying a configuration in which light-shielding layers are provided in a second area.
Figure 17C:
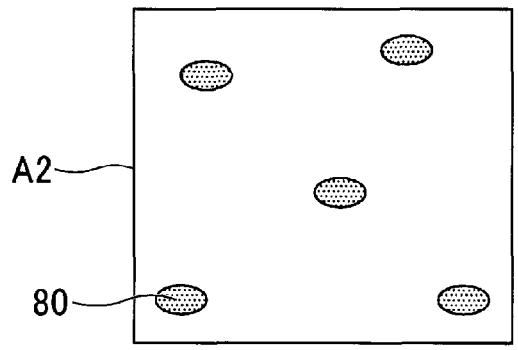
FIG. 17C is a second view for exemplifying a configuration in which the light-shielding layers are provided in the second area.

FIG. 17A illustrates the first area A1 in which the light-shielding layers 40 are provided, and FIG. 17B and FIG. 17C exemplify a configuration in which light-shielding layers are formed in the second area A2.

For example, as illustrated in FIG. 17B, light-shielding layers 80 whose size in planar view is smaller than that of the light-shielding layers 40 provided in the first area A1 (FIG. 17A) may be provided in the second area A2.

In addition, as illustrated in FIG. 17C, the number of the light-shielding layers 80 to be provided per unit area in the second area A2 may be reduced. That is, it may be configured so that a density of formation of the light-shielding layers 80 is reduced compared to the first area A1.

As illustrated in FIG. 17B and FIG. 17C, when the light-shielding layers 80 are provided in the second area A2, hollow portions are to be formed in the light-shielding layers 80.

Thus, a configuration in which no hollow portion is formed even when the light-shielding layers 80 are provided in the second area A2 will be exemplified.

Figure 18A:
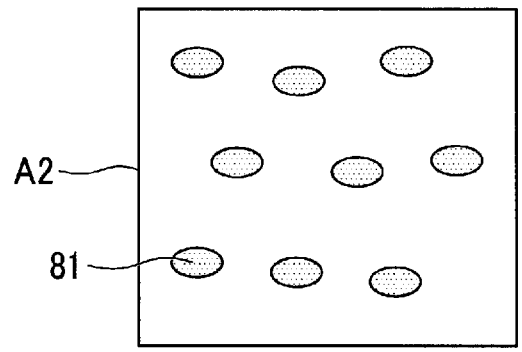
FIG. 18A is a plan view for exemplifying a configuration in which light-shielding layers having thin film thickness are provided in the second area.
Figure 18B:
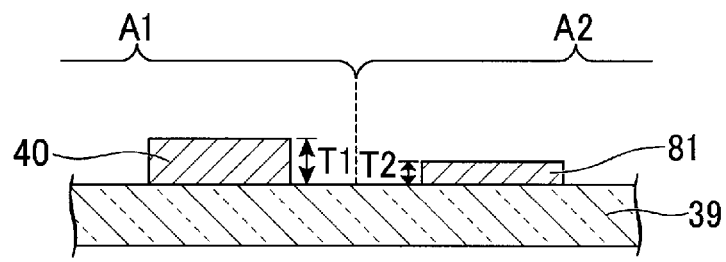
FIG. 18B is a sectional view for comparing film thickness of the light-shielding layers in the first area and the light-shielding layers in the second area.

FIG. 18A is a plan view for exemplifying a configuration in which light-shielding layers having thin film thickness are provided in the second area, and FIG. 18B is a sectional view for comparing film thickness of the light-shielding layers in the first area and the light-shielding layers in the second area.

As illustrated in FIG. 18A and FIG. 18B, film thickness T2 of the light-shielding layers 81 provided in the second area A2 is set to be smaller than film thickness T1 of the light-shielding layers 40 in the first area A1. Thereby, during the manufacturing process, a UV transmission rate in the light-shielding layers 81 when the rear surface of the substrate 39 is exposed is enhanced, so that the negative photosensitive resin layer on the light-shielding layers 81 is able to be cured. This makes it possible to form light-transmission portions having no hollow portion in the second area A2.

Figure 18C:
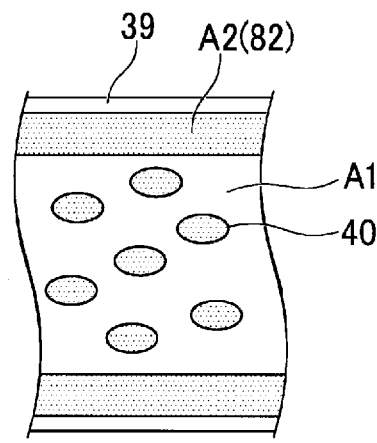
FIG. 18C illustrates a configuration in which visible light-shielding layers each having a UV transmission rate that is higher than that of the light-shielding layers is provided in the entire second area.

Though the configuration in which a plurality of light-shielding layers which are ellipse in planar view are provided in the second area A2 has been exemplified above, a visible light-shielding layer 82 having a UV transmission rate that is higher than that of the light-shielding layers 40 may be provided in the entire second area A2 as illustrated in FIG. 18C.

Third Embodiment

A light-control member of a third embodiment will be described below.

Note that, in the present embodiment, the same reference signs are assigned to components common with the embodiments above and detailed description thereof will be omitted.

Through the light-control member manufactured by a roll-to-roll manufacturing method has been described in the embodiments above, the light-control member manufactured in a single-sheet system will be described in the present embodiment.

Figure 19A:
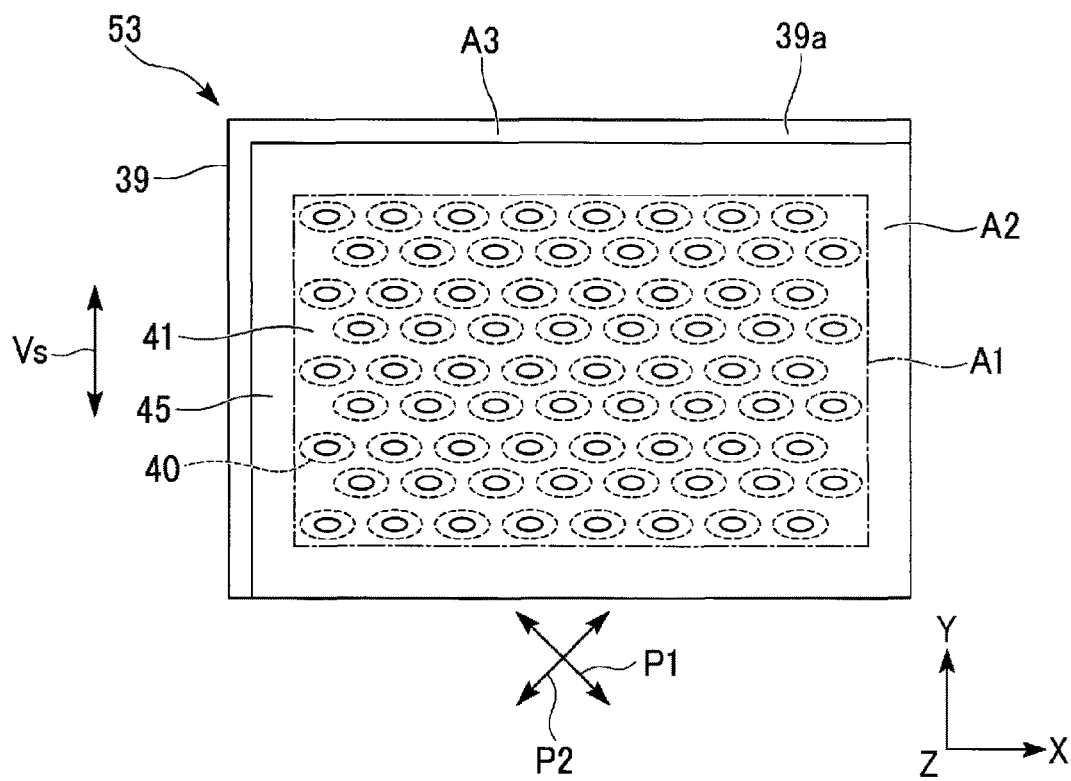
FIG. 19A is a plan view illustrating a schematic configuration of a light-control member in a third embodiment.
Figure 19B:
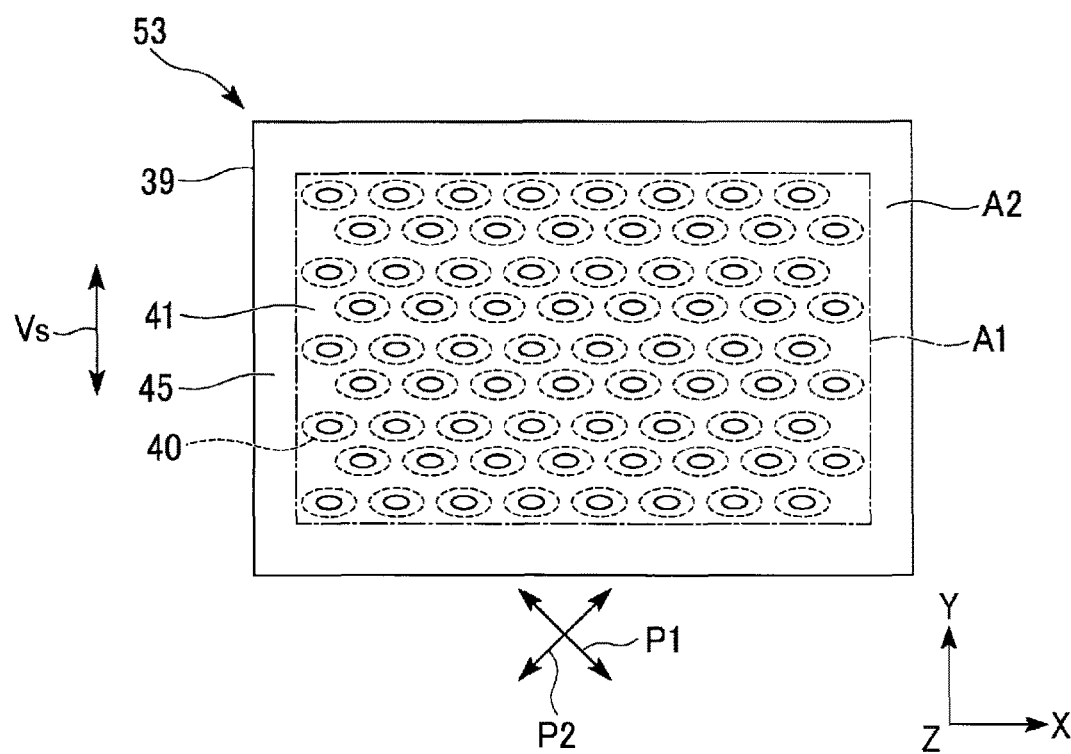
FIG. 19B is a plan view illustrating the light-control member from which a third area is cut off.

FIG. 19A is a plan view illustrating a schematic configuration of the light-control member in the third embodiment. FIG. 19B is a plan view illustrating the light-control member from which the third area is cut off.

As illustrated in FIG. 19A, a light-control member 53 (light-control member 7) in the present embodiment has, on the one surface 39a of the substrate 39, the first area A1 in which the light-shielding layers 40 and the light-diffusion section 41 are formed, the second area A2 in which the support section 45 is formed so as to surround the periphery of the first area A1, and the third area A3 which is on the outer side of the second area A2 and by which the one surface 39a is partially exposed along two neighboring sides of the substrate 39. However, the third area A3 may be cut off as necessary as illustrated in FIG. 19B.

Figure 20A:
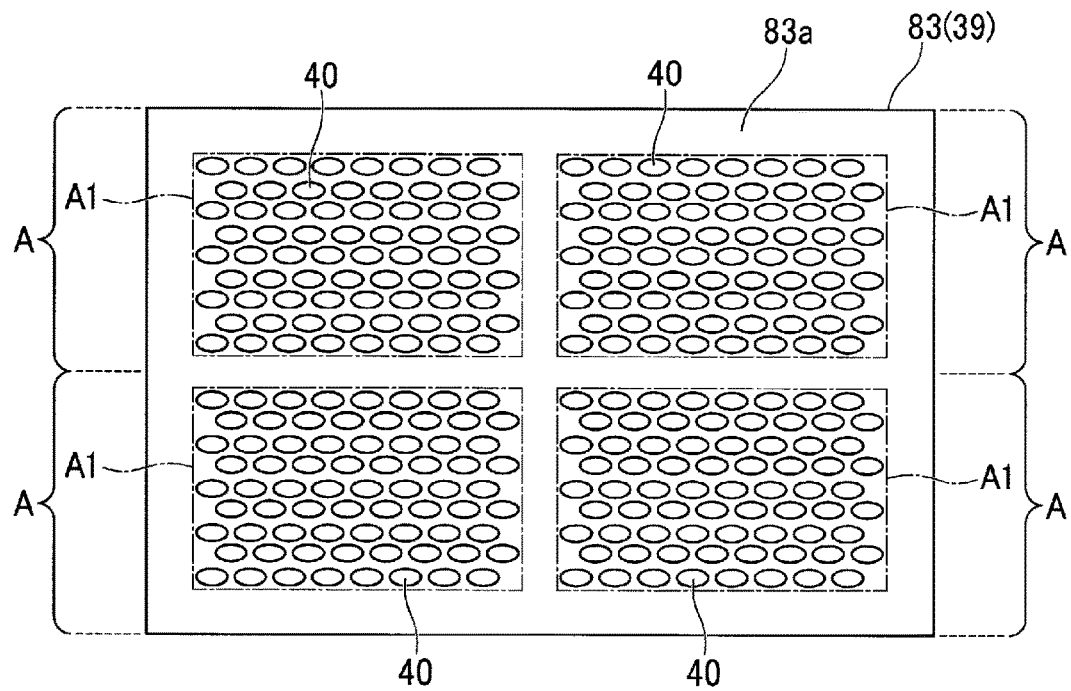
FIG. 20A is a first view for explaining a process of manufacturing the light-control member in the third embodiment.
Figure 20B:
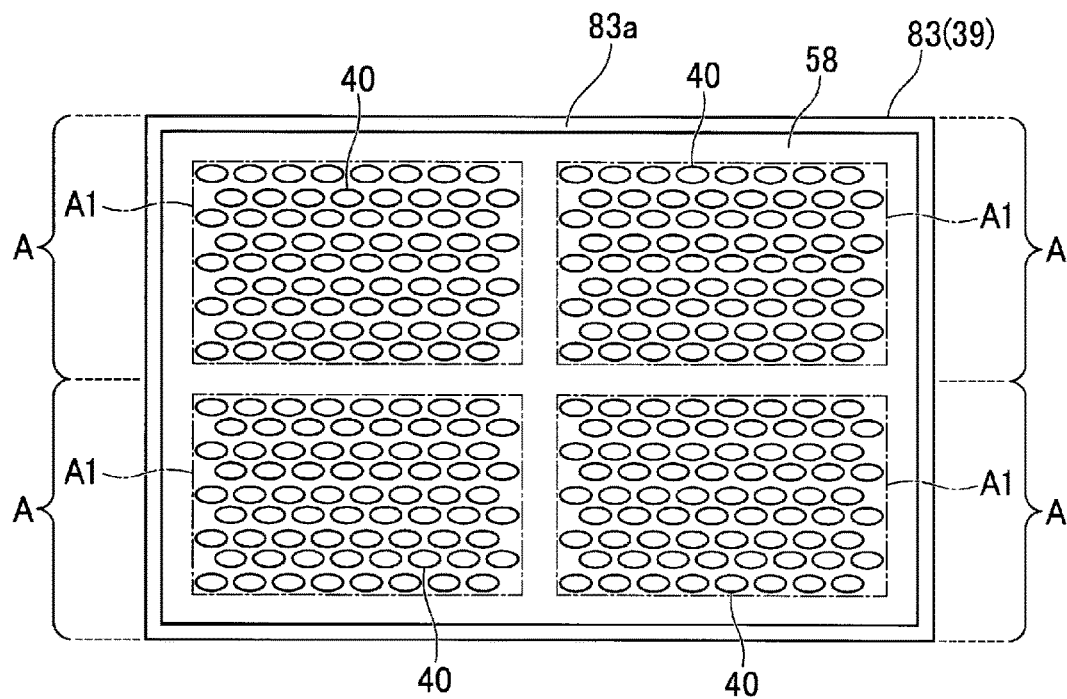
FIG. 20B is a second view for explaining the process of manufacturing the light-control member in the third embodiment.
Figure 21:
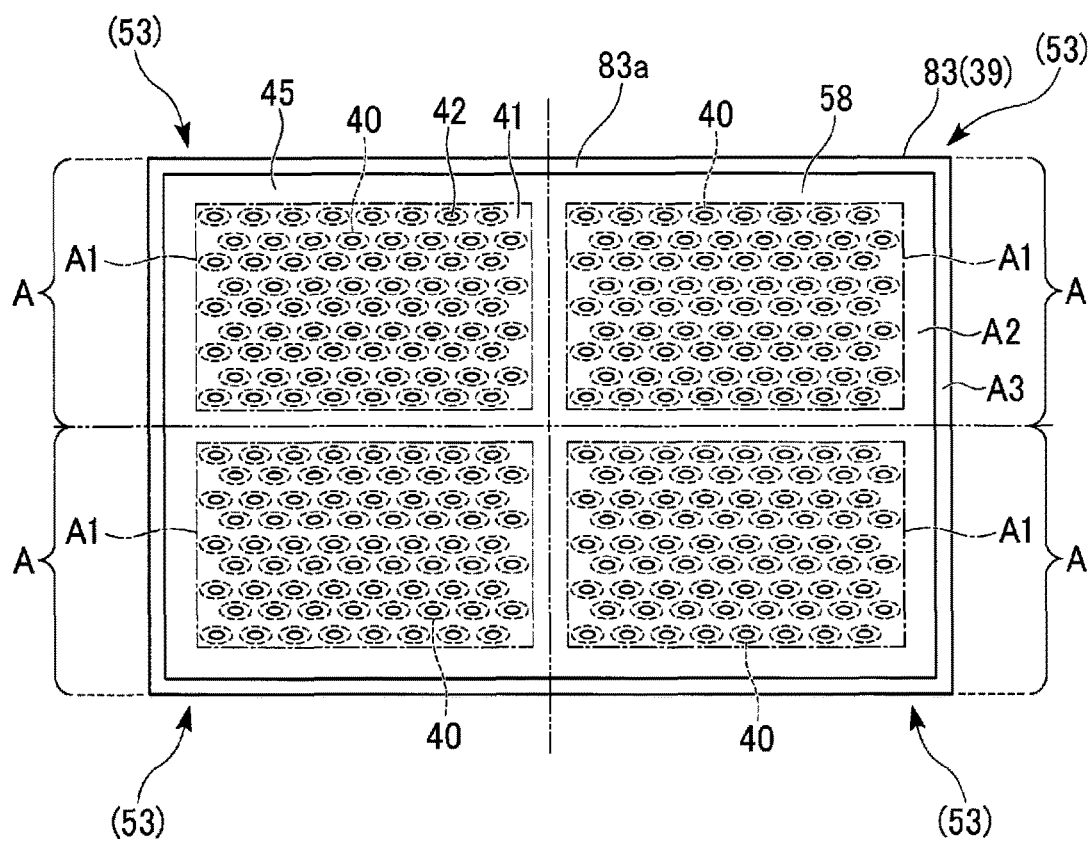
FIG. 21 is a view for explaining the process of manufacturing the light-control member in the third embodiment.

FIG. 20A, FIG. 20B, and FIG. 21 are views for explaining a process of manufacturing the light-control member in the third embodiment.

First, as illustrated in FIG. 20A, a large-sized transparent substrate 83 having a plurality of (four, here) light-control member formation areas A on one surface 83a is prepared. A plurality of light-shielding layers 40 are formed in each of the first areas A1 set on the one surface 83a. The neighboring first areas A1 are provided at a predetermined interval and the second areas A2 are present in the peripheries of the respective first areas A1.

Then, as illustrated in FIG. 20B, the negative photosensitive resin layer 58 is formed on the one surface 83a of the transparent substrate 83 so as to cover all the light-shielding layers 40 formed in the first areas A1. At this time, the negative photosensitive resin layer 58 is formed so that the peripheral edge of the one surface 83a, which serves as the third area A3, is exposed.

Thereafter, the negative photosensitive resin layer 58 is irradiated with ultraviolet rays from the rear surface (the surface opposite to the one surface 83a) side of the transparent substrate 83 by using the light-shielding layers 40 as a mask and is subjected to exposure and development, so that a plurality of light-diffusion sections and hollow portions (none of which is illustrated in FIG. 20A) are formed in each of the first areas A1.

Then, as illustrated in FIG. 21, the transparent substrate 83 is cut off for each light-control member formation area A. In the present embodiment, the transparent substrate 83 is cut off at a position of bisecting the second area A2 which is between the neighboring first areas A1 to thereby obtain a plurality of light-control members 53.

Even when the manufacturing method in the single-sheet system is used in order to correspond to the large-sized light-control member 53 as described above, the support section 45 as a support structure is able to be formed around the first area A1 having the minute structure. This makes it possible to prevent the light-diffusion section 41 from being deformed because of concentration of the load on the outer peripheral portions of the light-control members 53 positioned in the lower side when the diced light-control members 53 are vertically stacked.

When the transparent substrate 83 is cut off during manufacturing, mechanical external force is strongly applied to the cut-off portion and no light-shielding layer 40 is formed in the cut-off portion. Accordingly, bonding strength between the resin layer (support section 45) and the transparent substrate 83 is great, thus making it possible to prevent, for example, separation of the resin layer (support section 45) from the transparent substrate 83.

Fourth Embodiment

A light-control member of a fourth embodiment will be described below.

Note that, in the present embodiment, the same reference signs are assigned to components common with the embodiments above and detailed description thereof will be omitted.

The light-control member of the present embodiment is a light-control member with a buffer layer.

Figure 22:
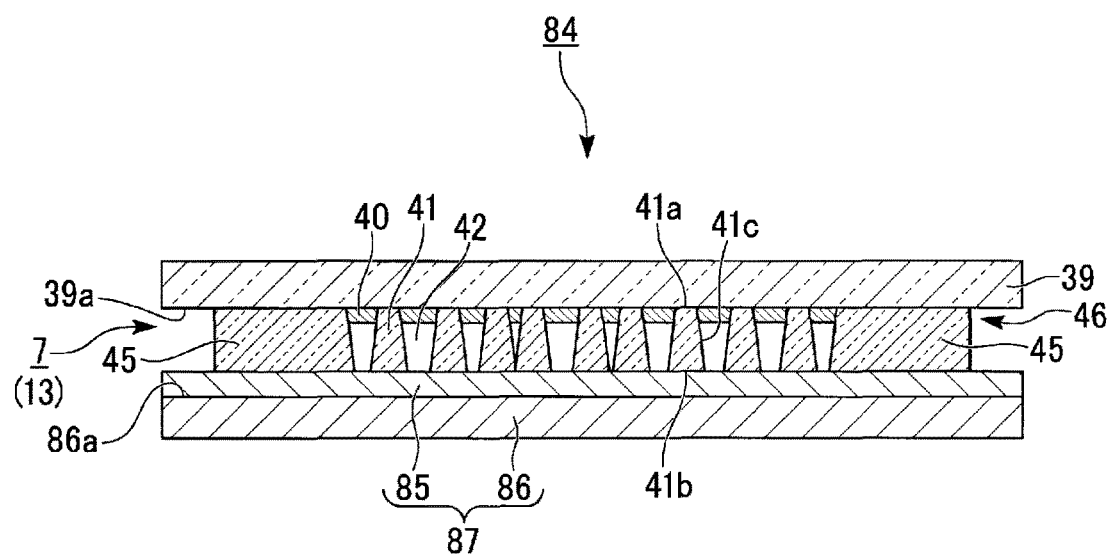
FIG. 22 is a sectional view illustrating a schematic configuration of a light-control member in a fourth embodiment.

FIG. 22 is a sectional view illustrating a schematic configuration of the light-control member in the fourth embodiment.

As illustrated in FIG. 22, a light-control member 84 (light-control member 7) is configured to include a buffer substrate 87, which is formed of a buffer layer (elastic member) 85 and a transparent substrate (second substrate) 86, on the opposite side to the substrate 39 in the light-diffusion layer 46.

When pressure is applied from the substrate 39 side, the buffer layer 85 is elastically deformed to alleviate the pressure applied to the periphery of the light-control member 84. The buffer layer 85 is adhered to the light incident end surface 41b of the light-diffusion section 41.

For the buffer layer 85, for example, acryl-based transparent resins, polyolefin-based elastomer, silicone-based resins, urethane-based resins, rubber, or the like may be used. Among them, one having a function as an adhesion layer (adhesive) (adhesiveness) is preferably used. Thus, with the adhesion function of the buffer layer 85, the buffer substrate 87 is able to be bonded to the light-diffusion layer 46.

The buffer layer 85 preferably has a refractive index lower than that of the light-diffusion section 41. In this case, since a reflectance in each interface becomes lower in a case where the refractive index changes in a stepwise manner compared to a case where it changes suddenly, light efficiency of the light-control member 84 is able to be improved.

The buffer layer 85 may have light transmissivity for the ultraviolet light (UV light). In this case, in a process for forming the light-diffusion section 41, the negative photosensitive resin layer which is to be the light-diffusion section 41 is irradiated with the ultraviolet light (UV light) from the substrate 39 side to perform exposure (patterning) by using the light-shielding layers 40 as a mask, and then, while protecting the light-diffusion section 41 by the buffer layer 85 bonded to the negative photosensitive resin layer, the ultraviolet light (UV light) is radiated from the light incident end surface 41b side, which is not shadowed by the light-shielding layers 40, thus making it possible to completely cure (post-cure) the light-diffusion section 41 evenly.

A transparent substrate 86 has a compression modulus that is higher than a compression modulus of the buffer layer 85.

The buffer layer 85 is formed entirely on the one surface 86a of the transparent substrate 86.

With the configuration of the present embodiment, even if a load is applied to the peripheries of a plurality of light-control members 84 when the light-control members 84 are stacked and kept, the buffer layer 85 alleviates the force while elastically deforming. This makes it possible to prevent the deformation of the light-diffusion section 41 more reliably.

Fifth Embodiment

A light-control member of a fifth embodiment will be described below.

Note that, in the present embodiment, the same reference signs are assigned to components common with the embodiments above and detailed description thereof will be omitted.

The liquid crystal display device of each of the embodiments described above has a configuration in which a light-control member having a plurality of light-shielding layers, a light-diffusion section, a hollow portion whose periphery is surrounded by the light-diffusion section is included in a first area of a substrate and the light-diffusion section is integrally formed so as to fill in spaces between the plurality of light-shielding layers. On the other hand, in the present embodiment, it is configured so that a plurality of light-diffusion sections are provided in a first area and the individual light-diffusion sections are independent.

A light-control member 90 in the present embodiment will be described in detail.

Figure 23:
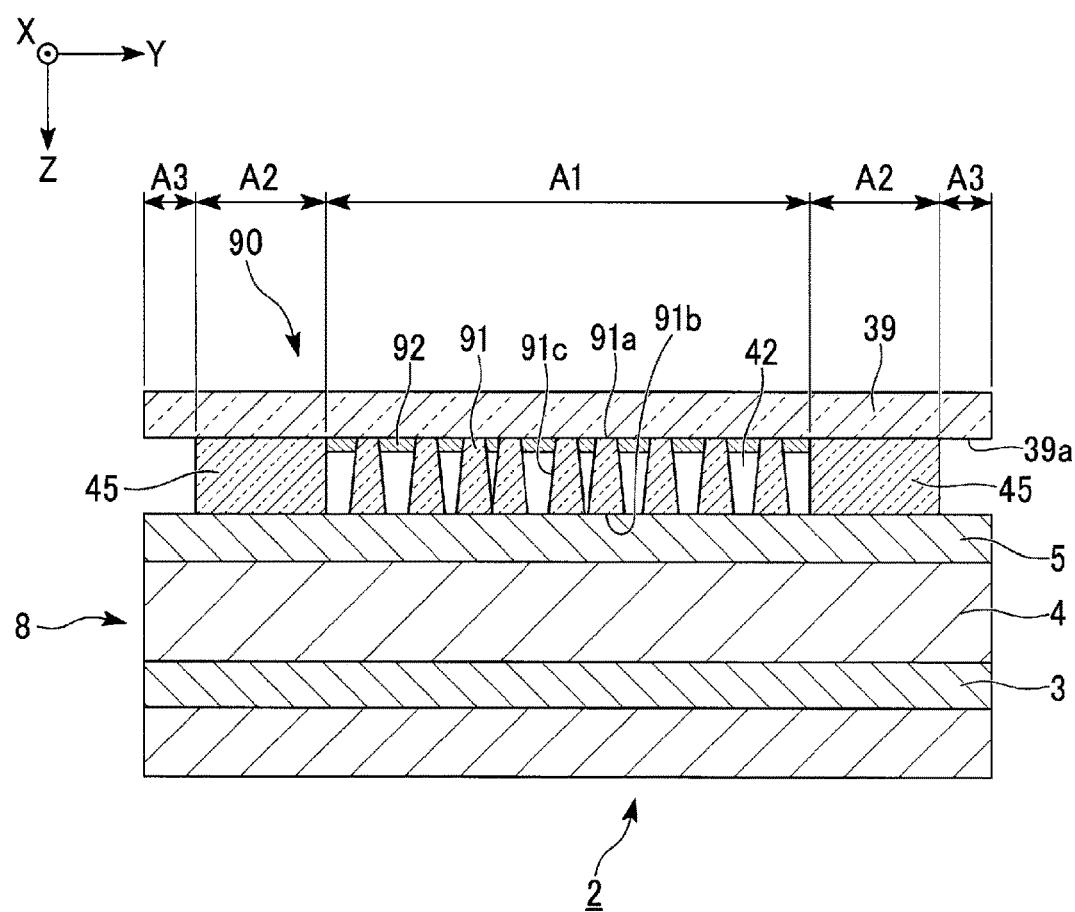
FIG. 23 is a vertical sectional view of a light-control member in a fifth embodiment.

FIG. 23 is a vertical sectional view of the light-control member in the fifth embodiment.

As illustrated in FIG. 23, the light-control member 90 (light-control member 7) includes the substrate 39, a plurality of light-diffusion sections 91 provided in the first area A1 on the one surface 39a of the substrate 39, light-shielding layers 92 formed so as to cover the one surface 39a around the light-diffusion sections 91, and the support sections 45 provided in the second areas A2. Note that, in the present embodiment as well, nothing is provided in the third areas at least on both end sides in the lateral direction of the substrate 39 and the one surface 39a is partially exposed.

Each of the plurality of light-diffusion sections 91 has a horizontal cross section (xy section) in a circular shape and is formed to have a small area of a light emitting end surface 91a on the substrate 39 side, and a great area of a light incident end surface 91b on the opposite side to the substrate 39. Each of the light-diffusion sections 91 as described above has a shape of a truncated cone shape which is a so-called inverse tapered shape when viewed from the substrate 39 side. Note that, air is present around each of the light-diffusion sections 91.

The light-control member 90 is arranged on the liquid crystal display body 8 in such a manner that the side on which the plurality of light-diffusion sections 91 are provided faces the second polarizer 5 and the substrate 39 side faces the viewing side.

Figure 24:
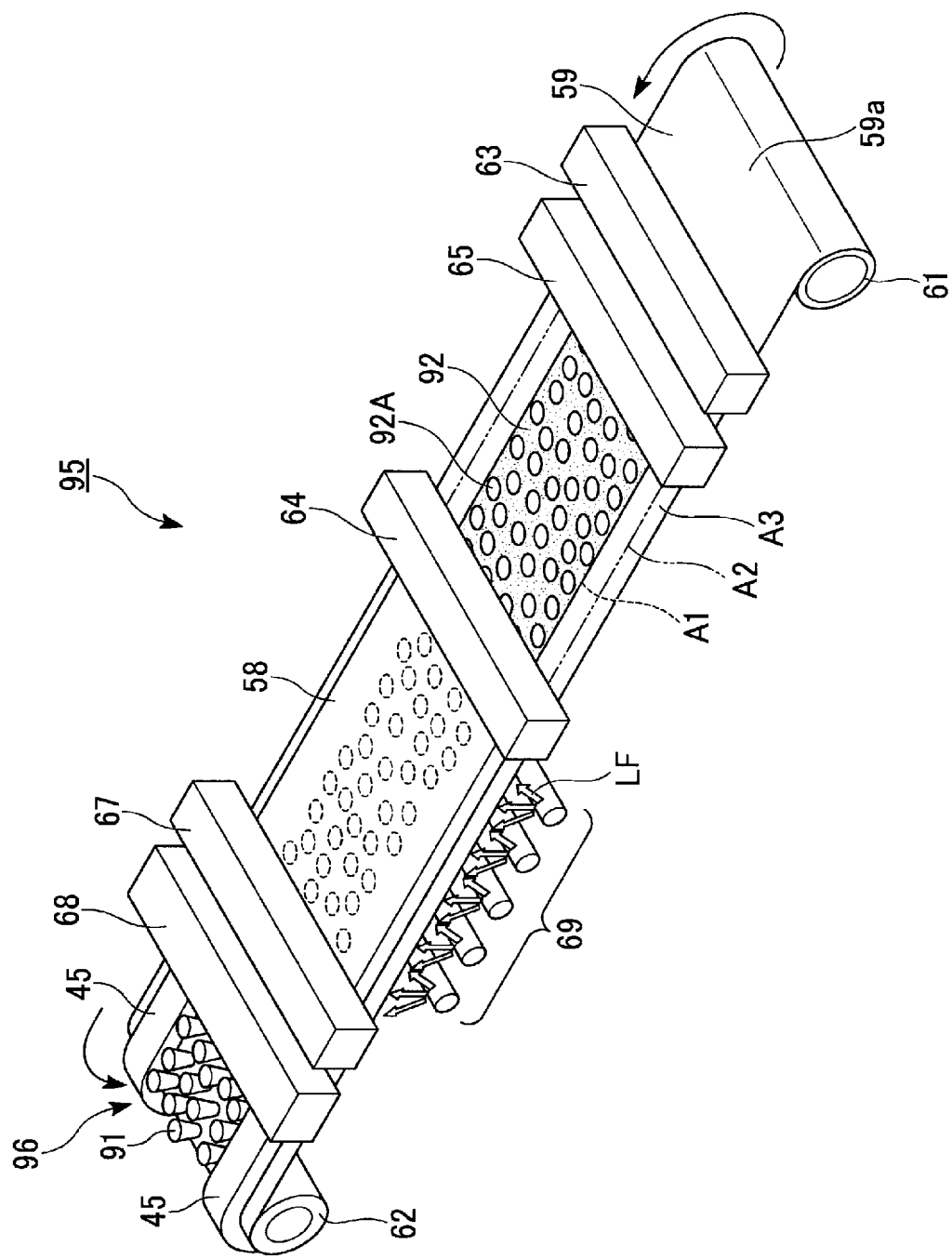
FIG. 24 is a schematic structural view illustrating one example of a device for manufacturing the light-control member in the fifth embodiment.

FIG. 24 is a schematic structural view illustrating one example of a device for manufacturing the light-control member.

A manufacturing device 95 illustrated in FIG. 24 feeds the long substrate 59 by a roll-to-roll process while performing various processing.

The manufacturing device 95 includes the feeding roller 61, the winding roller 62, the printing device 63 arranged from the feeding roller 61 side to the winding roller 62 side, the first drying device 65, the bar coating equipment 64, the developing device 67, and the second drying device 68. The exposure device 69 arranged below the substrate 39 is also included.

For manufacturing the light-control member 90 by using the manufacturing device 95, first, the substrate 59 made of polyethylene terephthalate having a thickness of 100 μm is prepared, and the light-shielding layers 92 having a plurality of circular apertures 92A are formed in the first area A1 on the one surface 59a of the substrate 59. The circular apertures 92A correspond to the formation areas of the light-diffusion sections 91 in the next step.

Next, by the bar coating equipment 64, transparent negative resist made of acrylic resin is applied, as the material of the light-diffusion sections, over the light-shielding layers 92 from the first area A1 to the second areas A2 on the substrate 59 to form the coating 58 having a film thickness of 25 μm.

Then, the coating 58 is irradiated with diffused light LF by using the light-shielding layers 92 as a mask to perform exposure from the substrate 59 side.

Subsequently, the negative photosensitive resin layer 58 is developed by the developing device 67 with the use of a dedicated developing solution, and dried at 80° by the second drying device 68 to form a plurality of light diffusion-sections 41 on the one surface 59a of the substrate 59.

Through the steps described above, a mother roll 96 including a plurality of light-control member formation areas is formed and is diced for each of the light-control member formation areas, so that the light-control member 90 of the present embodiment is completed.

By providing the support section 45 which does not have the minute structure in the second area A2 on the outer side of the first area A1 in which a large number of light-diffusion sections 41 each having a truncated cone shape are provided to have the minute structure as in the present embodiment, even when the mother roll 96 is wound up by the winding roller 62 during manufacturing, the load on both sides in the lateral direction of the substrate 59 is able to be received by the support section 45. This makes it possible to prevent the light-diffusion sections 91 from being deformed.

The preferred embodiments according to the invention have been described above with reference to the attached drawings, but the invention is of course not limited to these embodiments. It is clear that one of ordinary skill in the art can conceive of various modifications and changes within the field of the technical ideas as recited in the claims, and it is understood that they also pertain to the technical scope of the invention.

Figure 25:
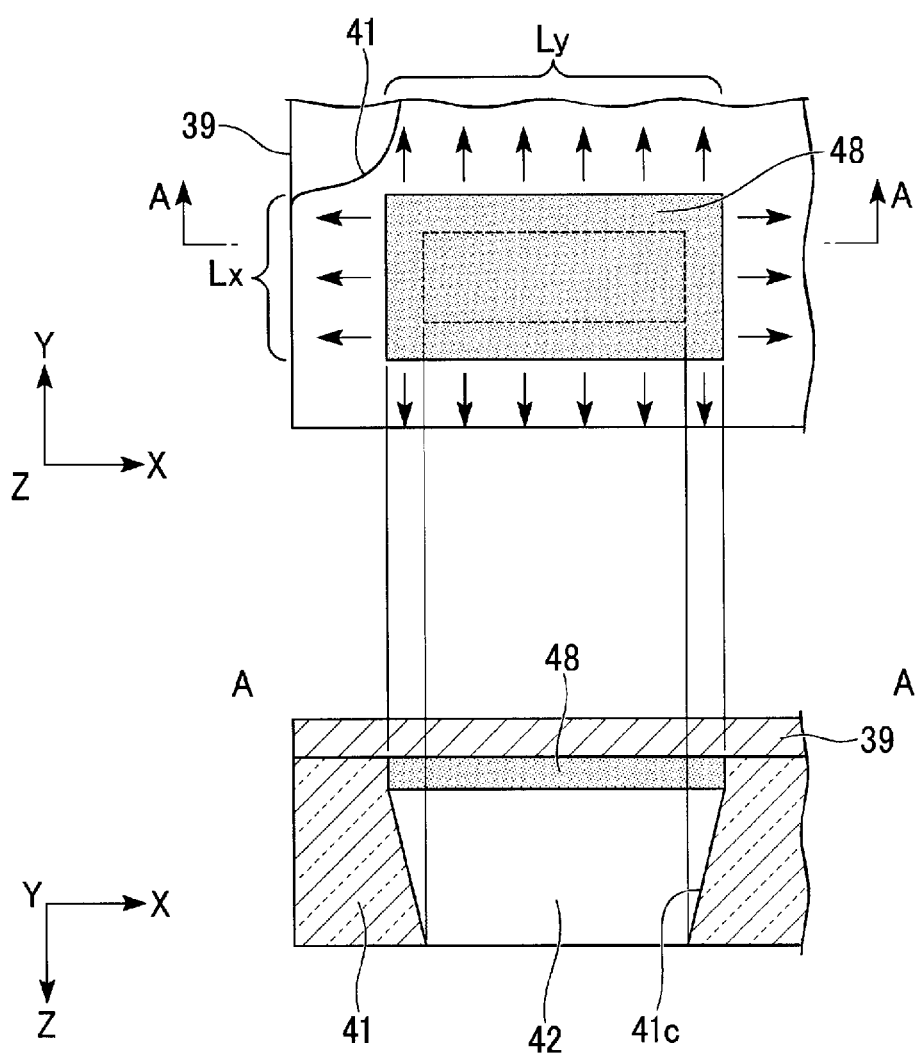
FIG. 25 illustrates a light-shielding layer whose planar shape is rectangle, in which an upper part is a plan view thereof and a lower part is a sectional view taken along an A-A line of the plan view.

FIG. 25 illustrates a light-shielding layer whose planar shape is rectangle, in which an upper part is a plan view thereof and a lower part is a sectional view taken along an A-A line of the plan view.

As illustrated in FIG. 25, the light-shielding layer 48 whose planar shape is rectangle may be used. The light-shielding layer 48 has the long-side direction substantially following the X-direction and has the short-side direction substantially following the Y-direction. Accordingly, in consideration of the orientation of the reflective surfaces 41c of the light-diffusion section 41, a proportion of the reflective surfaces 41c following the X-direction is greater than a proportion of the reflective surfaces 41c following the Y-direction in the reflective surfaces 41c of the light-diffusion section 41. Thus, a quantity of the light Ly reflected on the reflective surfaces 41c following the X-direction and diffused in the Y-direction is greater than a quantity of the light Lx reflected on the reflective surfaces 41c following the Y-direction and diffused in the X-direction.

Accordingly, the azimuthal direction Vs in which the diffusivity of the light-control member is the strongest is the Y-direction, which is the minor axis direction of the light-shielding layer 48.

A light-scattering layer may be added to be closer to the viewing side than the second polarizer 5 of the liquid crystal display device 1. The light-scattering layer preferably allows isotropic scattering, so that smooth visual characteristics for luminance (scattering characteristics) are able to be realized.

INDUSTRIAL APPLICABILITY

The invention is able to be used for a mother substrate, a light-control member, a method for manufacturing the light-control member, and a display device.

REFERENCE SIGNS LIST 1 liquid crystal display device (display device)
7 light-control member
8 liquid crystal display body (display body)
A light-control member formation area
R display area
P arrangement interval
W, W1, W2 width
13, 43, 53, 84, 90 light-control member
39, 59 substrate (first substrate)
39a inner surface (first surface)
40, 48, 80, 81 light-shielding layer
40b, 41b light incident end surface
41 light-diffusion section
41a light emitting end surface
41c reflective surface
45 support section (light transmitting material)
55 mother roll (mother substrate)
57 negative photosensitive resin (photosensitive resin layer)
59a surface
85 buffer layer (elastic member)
86 transparent substrate (second substrate)
A1 first area
A2 second area
A3 third area
Lx, Ly light
Vs azimuthal direction

The invention claimed is:

1. A mother substrate, comprising:
a first substrate having light transmissivity and including a light-control member formation area;
first light-shielding layers provided in a first area in the light-control member formation area;
a plurality of light-diffusion sections provided in an area other than the first light-shielding layers and formed of light transmitting material; and
the light transmitting material provided in a second area positioned on an outer side of the first area in the light-control member formation area, wherein
each of the plurality of light-diffusion sections includes a light emitting end surface positioned at one end of a first surface side of the first substrate, a light incident end surface opposing the light emitting end surface and having an area greater than an area of the light emitting end surface, and a reflective surface which is in contact with the light emitting end surface and the light incident end surface and on which light incident from the light incident end surface is reflected,
a formation area of the light transmitting material per unit area in the second area is greater than a formation area of the light transmitting material per unit area in the first area, and
a third area in which neither the first light-shielding layers nor the light transmitting material is present is provided on an outer side of the second area on a first surface of the first substrate.

2. The mother substrate according to claim 1, wherein second light-shielding layers are provided in the second area, and the second light-shielding layers have a UV transmission rate that is greater than a UV transmission rate of the first light-shielding layers.

3. The mother substrate according to claim 1, wherein a width in a planar view of the light transmitting material provided in the second area is wider than an arrangement interval between the first light-shielding layers.

4. The mother substrate according to any one of claim 1, wherein
second light-shielding layers are provided in the second area, and
a size in a planar view of each of the second light-shielding layers provided is smaller than a size in the planar view of each of the first light-shielding layers.

5. The mother substrate according to claim 1, wherein the first light-shielding layers are provided only in the first area.

6. The mother substrate according to claim 1, wherein a periphery of the first area is surrounded by the second area.

7. The mother substrate according to claim 1, wherein
a second substrate is arranged opposing the first surface of the first substrate with the light transmitting material therebetween, and
an elastic member is arranged between the light transmitting material and the second substrate.

8. A light-control member, comprising:
a first substrate having light transmissivity;
light-shielding layers provided in a first area on a first surface of the first substrate;
a light-diffusion section provided in an area other than the light-shielding layers and formed of light transmitting material; and
the light transmitting material provided in a second area positioned on an outer side of the first area on the first surface, wherein
the light-diffusion section includes a light emitting end surface in contact with the first surface of the first substrate, a light incident end surface opposing the light emitting end surface and having an area greater than an area of the light emitting end surface, and a reflective surface which is in contact with the light emitting end surface and the light incident end surface and on which light incident from the light incident end surface is reflected,
a formation area of the light transmitting material per unit area in the second area is greater than a formation area of the light transmitting material per unit area in the first area, and
a third area in which neither the light-shielding layers nor the light transmitting material is present is provided on an outer side of the second area on a first surface of the first substrate.

9. A light-control member manufacturing method for manufacturing a plurality of light-control members from a mother substrate having a plurality of light-control member formation areas on a first surface of a first substrate, the light-control member manufacturing method comprising:
forming light-shielding layers in a first area of the first surface;
forming a photosensitive resin layer in the first area in which the light-shielding layers are formed and a second area positioned on an outer side of the first area;
radiating light from a second surface side opposite to the first surface of the first substrate and exposing the photosensitive resin layer to light by using the light-shielding layers as a mask;
developing the photosensitive resin layer to thereby form a light-diffusion section in the first area and form a light transmitting material in the second area; and
cutting off the first substrate for each of the light-control member formation areas to obtain the plurality of light-control members, wherein
while forming the light transmitting material and the light-diffusion section simultaneously, the forming is performed such that a formation area of the light transmitting material per unit area in the second area is greater than a formation area of the light transmitting material per unit area in the first area, and
a third area in which neither the light-shielding layers nor the light transmitting material is present is provided on an outer side of the second area on the first surface of the first substrate.

10. The light-control member manufacturing method according to claim 9, wherein the first substrate is cut off in the second area.

11. The light-control member manufacturing method according to claim 9, wherein
the first substrate is fed by a roll-to-roll process, and
the photosensitive resin layer is formed on an inner side of both ends in a direction perpendicular to a feeding direction of the first substrate.

12. A display device, comprising:
a display body which receives an input signal and outputs a video image; and
a light-control member which is provided on a viewing side of the display body and diffuses and outputs light incident from the display body, wherein
the light control member is formed of the light-control member according to claim 9, and
the light-control member is provided such that a first area in which the light diffusion section is formed is positioned in a display area of the display body and a second area in which the light transmitting material is formed is positioned in an area other than the display area.

13. The display device according to claim 12, wherein
the light-control member is configured to have anisotropic scattering characteristics, and
an azimuthal direction in which a luminance viewing angle of the display body is relatively narrow and an azimuthal direction in which diffusivity of the light-control member is relatively strong substantially coincide with each other.

14. The mother substrate according to claim 2, wherein a density of formation of the second light-shielding layers is less than a density of formation of the first light-shielding layers.

15. The mother substrate according to claim 2, wherein a film thickness of the second light-shielding layers is thinner than a film thickness of the first light-shielding layers.

16. The mother substrate according to claim 1, wherein
the first area has a rectangular shape,
the second area has a rectangular opening-shape that surrounds the first area, and includes four sides, and
the third area contacts a portion of the four sides.

* * * * *